United States Patent
Romero

(10) Patent No.: US 11,493,361 B2
(45) Date of Patent: Nov. 8, 2022

(54) STRAY FIELD IMMUNE COIL-ACTIVATED SENSOR

(71) Applicant: Allegro MicroSystems, LLC, Manchester, NH (US)

(72) Inventor: Hernán D. Romero, Buenos Aires (AR)

(73) Assignee: Allegro MicroSystems, LLC, Manchester, NH (US)

( * ) Notice: Subject to any disclaimer, the term of this patent is extended or adjusted under 35 U.S.C. 154(b) by 102 days.

(21) Appl. No.: 17/186,346

(22) Filed: Feb. 26, 2021

(65) Prior Publication Data

US 2022/0276071 A1    Sep. 1, 2022

(51) Int. Cl.
*G01B 7/14* (2006.01)
*G01B 7/30* (2006.01)
(Continued)

(52) U.S. Cl.
CPC ............... *G01D 5/14* (2013.01); *G01B 7/003* (2013.01); *G01D 5/145* (2013.01); *G01D 5/2013* (2013.01);
(Continued)

(58) Field of Classification Search
CPC ........ G01D 5/14; G01D 5/145; G01D 11/245; G01D 5/2013; G01B 7/003; G01B 7/14; G01B 7/30
(Continued)

(56) References Cited

U.S. PATENT DOCUMENTS 3,132,337 A    5/1964  Martin
3,195,043 A    7/1965  Burig et al.
(Continued)

FOREIGN PATENT DOCUMENTS

CN        683 469 A5      3/1994
CN     1 02323554 A       1/2012
(Continued)

OTHER PUBLICATIONS

Ahn et al.; "A New Toroidal-Meander Type Integrated Inductor with a Multilevel Meander Magnetic Core;" IEEE Transaction on Magnetics; vol. 30; No. 1; Jan. 1, 1994; 7 pages.
(Continued)

*Primary Examiner* — Raul J Rios Russo
(74) *Attorney, Agent, or Firm* — Daly, Crowley, Mofford & Durkee, LLP

(57) ABSTRACT

A magnetic field sensor includes: a substrate; a transmission coil formed on the substrate, the transmission coil being configured to generate a direct magnetic field; a sensing bridge that is formed on the substrate, the sensing bridge being configured to detect the direct magnetic field and a reflected magnetic field that is generated by a target, the reflected magnetic field being generated in response to eddy currents that are induced in the target by the direct magnetic field; a processing circuitry being configured to generate an output signal that is indicative of a position of the target, the output signal being generated by normalizing a first signal with respect to a second signal, the first signal being generated at least in part by using the sensing bridge, and the second signal being generated at least in part by using the sensing bridge, wherein the second signal is based on the detected direct magnetic field.

20 Claims, 13 Drawing Sheets

(51) Int. Cl.
  *G01R 33/00* (2006.01)
  *G01D 5/14* (2006.01)
  *G01B 7/00* (2006.01)
  *G01D 11/24* (2006.01)
  *G01D 5/20* (2006.01)

(52) U.S. Cl.
  CPC .............. *G01D 11/245* (2013.01); *G01B 7/14* (2013.01); *G01B 7/30* (2013.01)

(58) Field of Classification Search
  USPC ................................ 324/51, 55, 200, 207.11
  See application file for complete search history.

(56) References Cited

U.S. PATENT DOCUMENTS

| | | |
|---|---|---|
| 3,281,628 A | 10/1966 | Bauer et al. |
| 3,607,528 A | 9/1971 | Gassaway |
| 3,611,138 A | 10/1971 | Winebrener |
| 3,661,061 A | 5/1972 | Tokarz |
| 3,728,786 A | 4/1973 | Lucas et al. |
| 4,048,670 A | 9/1977 | Eysermans |
| 4,180,753 A | 12/1979 | Cook, II |
| 4,188,605 A | 2/1980 | Stout |
| 4,204,317 A | 5/1980 | Winn |
| 4,236,832 A | 12/1980 | Komatsu et al. |
| 4,283,643 A | 8/1981 | Levin |
| 4,315,523 A | 2/1982 | Mahawili et al. |
| 4,438,347 A | 3/1984 | Gehring |
| 4,573,258 A | 3/1986 | Io et al. |
| 4,614,111 A | 9/1986 | Wolff |
| 4,649,796 A | 3/1987 | Schmidt |
| 4,670,715 A | 6/1987 | Fuzzell |
| 4,703,378 A | 10/1987 | Imakoshi et al. |
| 4,719,419 A | 1/1988 | Dawley |
| 4,733,455 A | 3/1988 | Nakamura et al. |
| 4,745,363 A | 5/1988 | Carr et al. |
| 4,746,859 A | 5/1988 | Malik |
| 4,752,733 A | 6/1988 | Petr et al. |
| 4,758,943 A | 7/1988 | Astrom et al. |
| 4,760,285 A | 7/1988 | Nelson |
| 4,764,767 A | 8/1988 | Ichikawa et al. |
| 4,769,344 A | 9/1988 | Sakai et al. |
| 4,772,929 A | 9/1988 | Manchester |
| 4,789,826 A | 12/1988 | Willett |
| 4,796,354 A | 1/1989 | Yokoyama et al. |
| 4,823,075 A | 4/1989 | Alley |
| 4,833,406 A | 5/1989 | Foster |
| 4,893,027 A | 1/1990 | Kammerer et al. |
| 4,908,685 A | 3/1990 | Shibasaki et al. |
| 4,910,861 A | 3/1990 | Dohogne |
| 4,935,698 A | 6/1990 | Kawaji et al. |
| 4,944,028 A | 7/1990 | Iijima et al. |
| 4,954,777 A | 9/1990 | Klopfer et al. |
| 4,970,411 A | 11/1990 | Haig et al. |
| 4,983,916 A | 1/1991 | Iijima et al. |
| 4,991,447 A | 2/1991 | Yahagi et al. |
| 5,012,322 A | 4/1991 | Guillotte et al. |
| 5,021,493 A | 6/1991 | Sandstrom |
| 5,028,868 A | 7/1991 | Murata et al. |
| 5,045,920 A | 9/1991 | Vig et al. |
| 5,078,944 A | 1/1992 | Yoshino |
| 5,084,289 A | 1/1992 | Shin et al. |
| 5,121,289 A | 6/1992 | Gagliardi |
| 5,137,677 A | 8/1992 | Murata |
| 5,139,973 A | 8/1992 | Nagy et al. |
| 5,167,896 A | 12/1992 | Hirota et al. |
| 5,185,919 A | 2/1993 | Hickey |
| 5,196,794 A | 3/1993 | Murata |
| 5,200,698 A | 4/1993 | Thibaud |
| 5,210,493 A | 5/1993 | Schroeder et al. |
| 5,216,405 A | 6/1993 | Schroeder et al. |
| 5,244,834 A | 9/1993 | Suzuki et al. |
| 5,247,202 A | 9/1993 | Popovic et al. |
| 5,247,278 A | 9/1993 | Pant et al. |
| 5,250,925 A | 10/1993 | Shinkle |
| 5,286,426 A | 2/1994 | Rano, Jr. et al. |
| 5,289,344 A | 2/1994 | Gagnon et al. |
| 5,315,245 A | 5/1994 | Schroeder et al. |
| 5,329,416 A | 7/1994 | Ushiyama et al. |
| 5,332,956 A | 7/1994 | Oh |
| 5,332,965 A | 7/1994 | Wolf et al. |
| 5,351,028 A | 9/1994 | Krahn |
| 5,399,968 A | 3/1995 | Sheppard et al. |
| 5,412,255 A | 5/1995 | Wallrafen |
| 5,414,355 A | 5/1995 | Davidson et al. |
| 5,424,558 A | 6/1995 | Borden et al. |
| 5,432,444 A | 7/1995 | Yasohama et al. |
| 5,434,105 A | 7/1995 | Liou |
| 5,453,727 A | 9/1995 | Shibasaki et al. |
| 5,469,058 A | 11/1995 | Dunnam |
| 5,479,695 A | 1/1996 | Grader et al. |
| 5,486,759 A | 1/1996 | Seiler et al. |
| 5,488,294 A | 1/1996 | Liddell et al. |
| 5,491,633 A | 2/1996 | Henry et al. |
| 5,497,081 A | 3/1996 | Wolf et al. |
| 5,500,589 A | 3/1996 | Sumcad |
| 5,500,994 A | 3/1996 | Itaya |
| 5,508,611 A | 4/1996 | Schroeder et al. |
| 5,514,953 A | 5/1996 | Schultz et al. |
| 5,521,501 A | 5/1996 | Dettmann et al. |
| 5,545,983 A | 8/1996 | Okeya et al. |
| 5,551,146 A | 9/1996 | Kawabata et al. |
| 5,581,170 A | 12/1996 | Mammano et al. |
| 5,581,179 A | 12/1996 | Engel et al. |
| 5,596,272 A | 1/1997 | Busch |
| 5,621,319 A | 4/1997 | Bilotti et al. |
| 5,627,315 A | 5/1997 | Figi et al. |
| 5,631,557 A | 5/1997 | Davidson |
| 5,640,090 A | 6/1997 | Furuya et al. |
| 5,691,637 A | 11/1997 | Oswald et al. |
| 5,696,790 A | 12/1997 | Graham et al. |
| 5,712,562 A | 1/1998 | Berg |
| 5,714,102 A | 2/1998 | Highum et al. |
| 5,719,496 A | 2/1998 | Wolf |
| 5,729,128 A | 3/1998 | Bunyer et al. |
| 5,757,181 A | 5/1998 | Wolf et al. |
| 5,781,005 A | 7/1998 | Vig et al. |
| 5,789,658 A | 8/1998 | Henn et al. |
| 5,789,915 A | 8/1998 | Ingraham |
| 5,796,249 A | 8/1998 | Andraet et al. |
| 5,798,462 A | 8/1998 | Briefer et al. |
| 5,818,222 A | 10/1998 | Ramsden |
| 5,818,223 A | 10/1998 | Wolf |
| 5,839,185 A | 11/1998 | Smith et al. |
| 5,841,276 A | 11/1998 | Makino et al. |
| 5,859,387 A | 1/1999 | Gagnon |
| 5,883,567 A | 3/1999 | Mullins, Jr. |
| 5,886,070 A | 3/1999 | Honkura et al. |
| 5,896,030 A | 4/1999 | Hasken |
| 5,912,556 A | 6/1999 | Frazee et al. |
| 5,963,028 A | 10/1999 | Engel et al. |
| 6,011,770 A | 1/2000 | Tan |
| 6,016,055 A | 1/2000 | Jager et al. |
| 6,032,536 A | 3/2000 | Peeters et al. |
| 6,043,644 A | 3/2000 | de Coulon et al. |
| 6,043,646 A | 3/2000 | Jansseune |
| 6,064,198 A | 5/2000 | Wolf et al. |
| 6,111,403 A | 8/2000 | Yokotani et al. |
| 6,136,250 A | 10/2000 | Brown |
| 6,169,396 B1 | 1/2001 | Yokotani et al. |
| 6,175,232 B1 | 1/2001 | De Coulon et al. |
| 6,175,233 B1 | 1/2001 | McCurley et al. |
| 6,180,041 B1 | 1/2001 | Takizawa |
| 6,184,679 B1 | 2/2001 | Popovic et al. |
| 6,198,373 B1 | 3/2001 | Ogawa et al. |
| 6,242,604 B1 | 6/2001 | Hudlicky et al. |
| 6,242,904 B1 | 6/2001 | Shirai et al. |
| 6,242,905 B1 | 6/2001 | Draxelmayr |
| 6,265,865 B1 | 7/2001 | Engel et al. |
| 6,278,269 B1 | 8/2001 | Vig et al. |
| 6,297,627 B1 | 10/2001 | Towne et al. |
| 6,339,322 B1 | 1/2002 | Loreck et al. |
| 6,351,506 B1 | 2/2002 | Lewicki |

(56) References Cited

U.S. PATENT DOCUMENTS

| | | |
|---|---|---|
| 6,356,068 B1 | 3/2002 | Steiner et al. |
| 6,366,079 B1 | 4/2002 | Uenoyama |
| 6,392,478 B1 | 5/2002 | Mulder et al. |
| 6,429,640 B1 | 8/2002 | Daughton et al. |
| 6,436,748 B1 | 8/2002 | Forbes et al. |
| 6,437,558 B2 | 8/2002 | Li et al. |
| 6,452,381 B1 | 9/2002 | Nakatani et al. |
| 6,462,536 B1 | 10/2002 | Mednikov et al. |
| 6,492,804 B2 | 12/2002 | Tsuge et al. |
| 6,501,270 B1 | 12/2002 | Opie |
| 6,504,363 B1 | 1/2003 | Dogaru et al. |
| 6,525,531 B2 | 2/2003 | Forrest et al. |
| 6,528,992 B2 | 3/2003 | Shinjo et al. |
| 6,542,847 B1 | 4/2003 | Lohberg et al. |
| 6,545,332 B2 | 4/2003 | Huang |
| 6,545,457 B2 | 4/2003 | Goto et al. |
| 6,545,462 B2 | 4/2003 | Schott et al. |
| 6,566,862 B1 | 5/2003 | Goto et al. |
| 6,566,872 B1 | 5/2003 | Sugitani |
| 6,640,451 B1 | 11/2003 | Vinarcik |
| 6,642,711 B2 | 11/2003 | Kawate et al. |
| 6,653,968 B1 | 11/2003 | Schneider |
| 6,674,679 B1 | 1/2004 | Perner et al. |
| 6,687,644 B1 | 2/2004 | Zinke et al. |
| 6,692,676 B1 | 2/2004 | Vig et al. |
| 6,707,298 B2 | 3/2004 | Suzuki et al. |
| 6,759,843 B2 | 7/2004 | Furlong |
| 6,770,163 B1 | 8/2004 | Kuah et al. |
| 6,781,233 B2 | 8/2004 | Zverev et al. |
| 6,781,359 B2 | 8/2004 | Stauth et al. |
| 6,798,193 B2 | 9/2004 | Zimmerman et al. |
| 6,815,944 B2 | 11/2004 | Vig et al. |
| 6,822,443 B1 | 11/2004 | Dogaru |
| 6,853,178 B2 | 2/2005 | Hayat-Dawoodi |
| 6,896,407 B2 | 5/2005 | Nomiyama et al. |
| 6,902,951 B2 | 6/2005 | Goller et al. |
| 6,917,321 B1 | 7/2005 | Haurie et al. |
| 6,956,366 B2 | 10/2005 | Butzmann |
| 6,989,921 B2 | 1/2006 | Bernstein et al. |
| 7,009,384 B2 | 3/2006 | Heremans et al. |
| 7,023,205 B1 | 4/2006 | Krupp |
| 7,026,808 B2 | 4/2006 | Vig et al. |
| 7,031,170 B2 | 4/2006 | Daeche et al. |
| 7,038,448 B2 | 5/2006 | Schott et al. |
| 7,049,924 B2 | 5/2006 | Hayashi et al. |
| 7,112,955 B2 | 9/2006 | Buchhold |
| 7,112,957 B2 | 9/2006 | Bicking |
| 7,126,327 B1 | 10/2006 | Busch |
| 7,132,825 B2 | 11/2006 | Martin |
| 7,190,784 B2 | 3/2007 | Li |
| 7,193,412 B2 | 3/2007 | Freeman |
| 7,199,579 B2 | 4/2007 | Scheller et al. |
| 7,259,545 B2 | 8/2007 | Stauth et al. |
| 7,265,531 B2 | 9/2007 | Stauth et al. |
| 7,269,992 B2 | 9/2007 | Lamb et al. |
| 7,285,952 B1 | 10/2007 | Hatanaka et al. |
| 7,292,095 B2 | 11/2007 | Burt et al. |
| 7,295,000 B2 | 11/2007 | Werth |
| 7,319,319 B2 | 1/2008 | Jones et al. |
| 7,323,780 B2 | 1/2008 | Daubenspeck et al. |
| 7,323,870 B2 | 1/2008 | Tatschl et al. |
| 7,325,175 B2 | 1/2008 | Momtaz |
| 7,345,468 B2 | 3/2008 | Okada et al. |
| 7,355,388 B2 | 4/2008 | Ishio |
| 7,361,531 B2 | 4/2008 | Sharma et al. |
| 7,362,094 B2 | 4/2008 | Voisine et al. |
| 7,365,530 B2 | 4/2008 | Bailey et al. |
| 7,385,394 B2 | 6/2008 | Auburger et al. |
| 7,425,821 B2 | 9/2008 | Monreal et al. |
| 7,474,093 B2 | 1/2009 | Ausserlechner |
| 7,476,953 B2 | 1/2009 | Taylor et al. |
| 7,518,354 B2 | 4/2009 | Stauth et al. |
| 7,592,801 B2 | 9/2009 | Bailey et al. |
| 7,598,601 B2 | 10/2009 | Taylor et al. |
| 7,605,647 B1 | 10/2009 | Romero et al. |
| 7,635,993 B2 | 12/2009 | Boeve |
| 7,694,200 B2 | 4/2010 | Forrest et al. |
| 7,701,208 B2 | 4/2010 | Nishikawa |
| 7,705,586 B2 | 4/2010 | Van Zon et al. |
| 7,729,675 B2 | 6/2010 | Krone |
| 7,746,056 B2 | 6/2010 | Stauth et al. |
| 7,746,065 B2 | 6/2010 | Pastre et al. |
| 7,764,118 B2 | 7/2010 | Kusuda et al. |
| 7,768,083 B2 | 8/2010 | Doogue et al. |
| 7,769,110 B2 | 8/2010 | Momtaz |
| 7,777,607 B2 | 8/2010 | Taylor et al. |
| 7,795,862 B2 | 9/2010 | Doogue et al. |
| 7,800,389 B2 | 9/2010 | Friedrich et al. |
| 7,808,074 B2 | 10/2010 | Knittl |
| 7,816,772 B2 | 10/2010 | Engel et al. |
| 7,816,905 B2 | 10/2010 | Doogue et al. |
| 7,839,141 B2 | 11/2010 | Werth et al. |
| 7,859,255 B2 | 12/2010 | Doogue et al. |
| 7,923,996 B2 | 4/2011 | Doogue et al. |
| 7,936,144 B2 | 5/2011 | Vig et al. |
| 7,956,604 B2 | 6/2011 | Ausserlechner |
| 7,961,823 B2 | 6/2011 | Kolze et al. |
| 7,982,454 B2 | 7/2011 | Fernandez et al. |
| 7,990,209 B2 | 8/2011 | Romero |
| 8,030,918 B2 | 10/2011 | Doogue et al. |
| 8,058,870 B2 | 11/2011 | Sterling |
| 8,063,631 B2 | 11/2011 | Fermon et al. |
| 8,063,634 B2 | 11/2011 | Sauber et al. |
| 8,080,993 B2 | 12/2011 | Theuss et al. |
| 8,106,649 B2 | 1/2012 | Kaita et al. |
| 8,106,654 B2 | 1/2012 | Theuss et al. |
| 8,128,549 B2 | 3/2012 | Testani et al. |
| 8,134,358 B2 | 3/2012 | Charlier et al. |
| 8,143,169 B2 | 3/2012 | Engel et al. |
| 8,253,210 B2 | 8/2012 | Theuss et al. |
| 8,274,279 B2 | 9/2012 | Gies |
| 8,299,783 B2 | 10/2012 | Fernandez et al. |
| 8,362,579 B2 | 1/2013 | Theuss et al. |
| 8,447,556 B2 | 5/2013 | Friedrich et al. |
| 8,461,677 B2 | 6/2013 | Ararao et al. |
| 8,486,755 B2 | 7/2013 | Ararao et al. |
| 8,542,010 B2 | 9/2013 | Cesaretti et al. |
| 8,559,139 B2 | 10/2013 | Theuss |
| 8,577,634 B2 | 11/2013 | Donovan et al. |
| 8,610,430 B2 | 12/2013 | Werth et al. |
| 8,624,588 B2 | 1/2014 | Vig et al. |
| 8,629,520 B2 | 1/2014 | Doogue et al. |
| 8,629,539 B2 | 1/2014 | Milano et al. |
| 8,680,846 B2 | 3/2014 | Cesaretti et al. |
| 8,680,848 B2 | 3/2014 | Foletto et al. |
| 8,692,546 B2 | 4/2014 | Cesaeretti et al. |
| 8,754,640 B2 | 6/2014 | Vig et al. |
| 8,773,124 B2 | 7/2014 | Ausserlechner |
| 8,915,710 B2 | 12/2014 | Chaudhry et al. |
| 9,024,622 B2 | 5/2015 | Hohe et al. |
| 9,081,041 B2 | 7/2015 | Friedrich et al. |
| 9,116,018 B2 | 8/2015 | Frachon |
| 9,164,156 B2 | 10/2015 | Elian et al. |
| 9,201,122 B2 | 12/2015 | Cesaeretti et al. |
| 9,201,123 B2 | 12/2015 | Elian et al. |
| 9,228,860 B2 | 1/2016 | Sharma et al. |
| 9,411,025 B2 | 8/2016 | David et al. |
| 9,664,494 B2 | 5/2017 | Fernandez et al. |
| 9,812,637 B2 | 11/2017 | Fermon et al. |
| 10,114,085 B2 | 10/2018 | Eagen |
| 10,145,908 B2 | 12/2018 | David et al. |
| 10,324,141 B2 | 6/2019 | Latham et al. |
| 10,330,745 B2 | 6/2019 | Eagen |
| 10,495,699 B2 | 12/2019 | Burdette et al. |
| 10,509,058 B2 | 12/2019 | Cadugan et al. |
| 10,578,684 B2 | 3/2020 | Cadugan et al. |
| 10,605,874 B2 | 3/2020 | Lassalle-Balier et al. |
| 10,641,842 B2 | 5/2020 | Latham et al. |
| 10,670,672 B2 | 6/2020 | David et al. |
| 10,734,443 B2 | 8/2020 | Lassalle-Balier et al. |
| 10,753,989 B2 | 8/2020 | Campiglio et al. |
| 10,837,943 B2 | 11/2020 | Romero |
| 10,866,117 B2 | 12/2020 | Kozomora et al. |
| 10,866,287 B1 | 12/2020 | Lassalle-Balier et al. |

(56) References Cited

U.S. PATENT DOCUMENTS

| | | |
|---|---|---|
| 10,917,092 B2 | 2/2021 | Romero |
| 10,996,289 B2 | 5/2021 | Latham et al. |
| 11,085,952 B2 | 8/2021 | Cadugan et al. |
| 11,112,230 B2 | 9/2021 | Latham et al. |
| 11,215,681 B2 | 1/2022 | David et al. |
| 11,262,422 B2 | 3/2022 | Romero et al. |
| 2001/0002791 A1 | 6/2001 | Tsuge et al. |
| 2001/0009367 A1 | 7/2001 | Seitzer et al. |
| 2001/0026153 A1 | 10/2001 | Nakamura et al. |
| 2002/0008513 A1 | 1/2002 | Hiligsmann et al. |
| 2002/0027488 A1 | 3/2002 | Hayat-Dawoodi et al. |
| 2002/0084923 A1 | 7/2002 | Li |
| 2002/0097639 A1 | 7/2002 | Ishizaki et al. |
| 2003/0001563 A1 | 1/2003 | Turner |
| 2003/0038675 A1 | 2/2003 | Gailus et al. |
| 2003/0057983 A1 | 3/2003 | Kim et al. |
| 2003/0062891 A1 | 4/2003 | Slates |
| 2003/0102909 A1 | 6/2003 | Motz |
| 2003/0222642 A1 | 12/2003 | Butzmann |
| 2003/0227286 A1 | 12/2003 | Dunisch et al. |
| 2004/0032251 A1 | 2/2004 | Zimmerman et al. |
| 2004/0046248 A1 | 3/2004 | Waelti et al. |
| 2004/0062362 A1 | 4/2004 | Matsuya |
| 2004/0080314 A1 | 4/2004 | Tsujii et al. |
| 2004/0135220 A1 | 7/2004 | Goto |
| 2004/0174164 A1 | 9/2004 | Ao |
| 2004/0184196 A1 | 9/2004 | Jayasekara |
| 2004/0189285 A1 | 9/2004 | Uenoyama |
| 2004/0196045 A1 | 10/2004 | Larsen |
| 2004/0263014 A1 | 12/2004 | Miya |
| 2005/0017709 A1 | 1/2005 | Stolfus et al. |
| 2005/0120782 A1 | 6/2005 | Kishibata et al. |
| 2005/0122095 A1 | 6/2005 | Dooley |
| 2005/0122099 A1 | 6/2005 | Imamoto et al. |
| 2005/0140355 A1 | 6/2005 | Yamada et al. |
| 2005/0167790 A1 | 8/2005 | Khor et al. |
| 2005/0179429 A1 | 8/2005 | Lohberg |
| 2005/0225318 A1 | 10/2005 | Bailey et al. |
| 2005/0225320 A1 | 10/2005 | Lee |
| 2005/0280411 A1 | 12/2005 | Bicking |
| 2006/0033487 A1 | 2/2006 | Nagano et al. |
| 2006/0038559 A1 | 2/2006 | Lamb et al. |
| 2006/0038561 A1 | 2/2006 | Honkura et al. |
| 2006/0068237 A1 | 3/2006 | Murphy et al. |
| 2006/0097717 A1 | 5/2006 | Tokuhara et al. |
| 2006/0104558 A1 | 5/2006 | Gallion et al. |
| 2006/0125473 A1 | 6/2006 | Frachon et al. |
| 2006/0181263 A1 | 8/2006 | Doogue et al. |
| 2006/0202692 A1 | 9/2006 | Tatschl et al. |
| 2006/0261801 A1 | 11/2006 | Busch |
| 2007/0001666 A1 | 1/2007 | Lee |
| 2007/0110199 A1 | 5/2007 | Momtaz et al. |
| 2007/0170533 A1 | 7/2007 | Doogue et al. |
| 2007/0247135 A1 | 10/2007 | Koga |
| 2007/0247141 A1 | 10/2007 | Pastre et al. |
| 2007/0285089 A1 | 12/2007 | Ibuki et al. |
| 2008/0013298 A1 | 1/2008 | Sharma et al. |
| 2008/0137784 A1 | 6/2008 | Krone |
| 2008/0211492 A1 | 9/2008 | Tsukada et al. |
| 2008/0237818 A1 | 10/2008 | Engel et al. |
| 2008/0238410 A1 | 10/2008 | Charlier et al. |
| 2008/0258722 A1 | 10/2008 | Zon et al. |
| 2008/0270067 A1 | 10/2008 | Eriksen et al. |
| 2009/0001964 A1 | 1/2009 | Strzalkowski |
| 2009/0009163 A1 | 1/2009 | Yamada |
| 2009/0058404 A1 | 3/2009 | Kurumado |
| 2009/0085706 A1 | 4/2009 | Baarman et al. |
| 2009/0102467 A1 | 4/2009 | Snell et al. |
| 2009/0137398 A1 | 5/2009 | Bozovic et al. |
| 2009/0140724 A1 | 6/2009 | Kentsch |
| 2009/0140725 A1 | 6/2009 | Ausserlechner |
| 2009/0146647 A1 | 6/2009 | Ausserlechner |
| 2009/0152696 A1 | 6/2009 | Dimasacat et al. |
| 2009/0167298 A1 | 7/2009 | Kreutzbruck et al. |
| 2009/0167301 A1 | 7/2009 | Ausserlechner |
| 2009/0168286 A1 | 7/2009 | Berkley et al. |
| 2009/0206831 A1 | 8/2009 | Fermon et al. |
| 2009/0212765 A1 | 8/2009 | Doogue et al. |
| 2009/0243601 A1 | 10/2009 | Feldtkeller |
| 2009/0251134 A1 | 10/2009 | Uenoyama |
| 2009/0256552 A1 | 10/2009 | Guo et al. |
| 2009/0315543 A1 | 12/2009 | Guo et al. |
| 2009/0315548 A1 | 12/2009 | Bonin |
| 2010/0033175 A1 | 2/2010 | Boeve et al. |
| 2010/0052667 A1 | 3/2010 | Kohama et al. |
| 2010/0053789 A1 | 3/2010 | Durie et al. |
| 2010/0072988 A1 | 3/2010 | Hammerschmidt et al. |
| 2010/0141249 A1 | 6/2010 | Ararao et al. |
| 2010/0188078 A1 | 7/2010 | Foletto et al. |
| 2010/0201356 A1 | 8/2010 | Koller et al. |
| 2010/0207620 A1 | 8/2010 | Gies |
| 2010/0264909 A1 | 10/2010 | Scheller et al. |
| 2010/0276769 A1 | 11/2010 | Theuss et al. |
| 2010/0295140 A1 | 11/2010 | Theuss et al. |
| 2010/0330708 A1 | 12/2010 | Engel et al. |
| 2011/0004278 A1 | 1/2011 | Aghassian et al. |
| 2011/0018533 A1 | 1/2011 | Cesaretti et al. |
| 2011/0031960 A1 | 2/2011 | Hohe et al. |
| 2011/0050220 A1 | 3/2011 | Bootle et al. |
| 2011/0127998 A1 | 6/2011 | Elian et al. |
| 2011/0224537 A1 | 9/2011 | Zieren et al. |
| 2011/0248711 A1 | 10/2011 | Ausserlechner |
| 2011/0267040 A1 | 11/2011 | Frachon |
| 2011/0285384 A1 | 11/2011 | Nomura |
| 2012/0019236 A1 | 1/2012 | Tiernan et al. |
| 2012/0019239 A1 | 1/2012 | Decitre |
| 2012/0062215 A1 | 3/2012 | Ide et al. |
| 2012/0293167 A1 | 11/2012 | Kitanaka et al. |
| 2012/0303305 A1 | 11/2012 | Bergqvist et al. |
| 2013/0113474 A1 | 5/2013 | Elian |
| 2013/0147470 A1 | 6/2013 | Mulholland et al. |
| 2013/0207648 A1 | 8/2013 | Zibold et al. |
| 2013/0214777 A1 | 8/2013 | Itoi |
| 2013/0241543 A1 | 9/2013 | Stenson et al. |
| 2013/0249029 A1 | 9/2013 | Vig et al. |
| 2013/0249544 A1 | 9/2013 | Vig et al. |
| 2013/0278246 A1 | 10/2013 | Stegerer et al. |
| 2013/0300401 A1 | 11/2013 | Krapf et al. |
| 2013/0300402 A1 | 11/2013 | Liu et al. |
| 2013/0300406 A1 | 11/2013 | Pepka et al. |
| 2014/0184214 A1 | 7/2014 | Schaffer et al. |
| 2014/0327435 A1 | 11/2014 | Rohrer |
| 2014/0333295 A1 | 11/2014 | Fernandez et al. |
| 2015/0022187 A1 | 1/2015 | Taylor et al. |
| 2015/0022197 A1 | 1/2015 | David et al. |
| 2015/0211895 A1 | 7/2015 | Reitsma et al. |
| 2015/0236869 A1 | 8/2015 | Vreeland et al. |
| 2015/0323612 A1 | 11/2015 | Latham |
| 2015/0346290 A1 | 12/2015 | Holm et al. |
| 2015/0362336 A1 | 12/2015 | Cook |
| 2016/0061863 A1 | 3/2016 | Zhang |
| 2016/0069662 A1 | 3/2016 | Mullenix et al. |
| 2016/0123771 A1 | 5/2016 | David et al. |
| 2016/0123774 A1 | 5/2016 | Foletto et al. |
| 2016/0139229 A1 | 5/2016 | Petrie et al. |
| 2016/0139230 A1 | 5/2016 | Petrie et al. |
| 2016/0169983 A1 | 7/2016 | Chang et al. |
| 2016/0339948 A1 | 11/2016 | Nakamura et al. |
| 2017/0131366 A1 | 5/2017 | Motz et al. |
| 2017/0248445 A1 | 8/2017 | Ausserlechner |
| 2018/0011150 A1 | 1/2018 | Pepka et al. |
| 2018/0340986 A1* | 11/2018 | Latham ................ G01D 5/145 |
| 2018/0340987 A1* | 11/2018 | Latham ................ G01R 33/032 |
| 2018/0340990 A1 | 11/2018 | Latham et al. |
| 2018/0356474 A1 | 12/2018 | Hammerschmidt et al. |
| 2019/0250220 A1* | 8/2019 | Latham ................ H01F 5/003 |
| 2020/0249286 A1 | 8/2020 | David et al. |

FOREIGN PATENT DOCUMENTS

| | | |
|---|---|---|
| CN | 102331587 A | 1/2012 |
| CN | 102483443 A | 5/2012 |
| CN | 102713654 A | 10/2012 |
| CN | 102954808 A | 3/2013 |

(56) References Cited

FOREIGN PATENT DOCUMENTS

| | | |
|---|---|---|
| CN | 105021864 A | 11/2015 |
| CN | 105378500 A | 3/2016 |
| DE | 25 18 054 | 11/1976 |
| DE | 40 31 560 A | 4/1992 |
| DE | 195 39 458 | 4/1997 |
| DE | 196 34 715 | 3/1998 |
| DE | 196 50 935 | 6/1998 |
| DE | 198 38 433 | 3/1999 |
| DE | 198 51 839 | 11/1999 |
| DE | 199 61 504 | 6/2001 |
| DE | 102 10 184 | 9/2003 |
| DE | 103 14 602 | 10/2004 |
| DE | 10 2006 037 226 | 2/2008 |
| DE | 10 2007 018 238 | 10/2008 |
| DE | 10 2007 041 230 B3 | 4/2009 |
| DE | 10 2010 016 584 | 11/2010 |
| DE | 10 2011 102483 | 11/2012 |
| EP | 0146091 | 6/1985 |
| EP | 0 289 414 A2 | 11/1988 |
| EP | 0 289 414 A3 | 11/1988 |
| EP | 0 357 013 A2 | 3/1990 |
| EP | 0 357 013 A3 | 3/1990 |
| EP | 0 361 456 A2 | 4/1990 |
| EP | 0629834 | 12/1994 |
| EP | 0 680 103 | 11/1995 |
| EP | 0 898 180 A2 | 2/1999 |
| EP | 0 944 888 B1 | 10/2001 |
| EP | 1306687 A2 | 5/2003 |
| EP | 1 443 332 | 8/2004 |
| EP | 1 580 560 | 9/2005 |
| EP | 1 637 898 | 3/2006 |
| EP | 1 662 353 | 5/2006 |
| EP | 1 679 524 | 7/2006 |
| EP | 1 850 143 | 10/2007 |
| EP | 2 063 229 | 5/2009 |
| EP | 1 797496 | 7/2009 |
| EP | 2402719 | 1/2012 |
| EP | 2 685 273 | 1/2014 |
| EP | 3 139 190 | 8/2017 |
| FR | 2 748 105 | 10/1997 |
| FR | 2 909 756 | 6/2008 |
| GB | 2135060 A | 8/1984 |
| GB | 2276727 A | 10/1994 |
| GB | 2 481 482 | 12/2011 |
| JP | S 5771504 A | 5/1982 |
| JP | S 60-152950 | 8/1985 |
| JP | S 60182503 A | 9/1985 |
| JP | S 61-48777 | 3/1986 |
| JP | S 6367583 A | 3/1988 |
| JP | 363 084176 A | 4/1988 |
| JP | S 63-263782 | 10/1988 |
| JP | S 63-300911 | 12/1988 |
| JP | H 02-116753 | 5/1990 |
| JP | H 03-29817 | 2/1991 |
| JP | H 0335182 A | 2/1991 |
| JP | H 04-095817 | 3/1992 |
| JP | H 06-273437 | 9/1994 |
| JP | H 07/128295 A | 5/1995 |
| JP | H 08-097486 | 4/1996 |
| JP | H 08-511348 A | 11/1996 |
| JP | H 09-1 66612 | 6/1997 |
| JP | H 09/292471 A | 11/1997 |
| JP | H 10-318784 | 12/1998 |
| JP | H 10-332725 | 12/1998 |
| JP | H 11-064363 | 3/1999 |
| JP | H 11-074142 | 3/1999 |
| JP | 2000-183241 | 6/2000 |
| JP | 2001-043475 A | 2/2001 |
| JP | 2001-141738 | 5/2001 |
| JP | 2001-165702 A | 6/2001 |
| JP | 2001-1659951 | 6/2001 |
| JP | 2002-117500 A | 4/2002 |
| JP | 2002-149013 A | 5/2002 |
| JP | 2002-357920 A | 12/2002 |
| JP | 2003-177171 | 6/2003 |
| JP | 2003-202365 A | 7/2003 |
| JP | 2003/240759 A | 8/2003 |
| JP | 2003-287439 | 10/2003 |
| JP | 2004-055932 | 2/2004 |
| JP | 2004-093381 | 3/2004 |
| JP | 2004-152688 | 5/2004 |
| JP | 2004-356338 A | 12/2004 |
| JP | 2004-357858 A | 12/2004 |
| JP | 2005-517928 | 6/2005 |
| JP | 2005-337866 | 12/2005 |
| JP | 2005-345302 | 12/2005 |
| JP | 2006-003096 A | 1/2006 |
| JP | 2006-003116 A | 1/2006 |
| JP | 2006-275764 | 10/2006 |
| JP | 2006-284466 A | 10/2006 |
| JP | 2007-012582 A | 1/2007 |
| JP | 2007-218799 | 8/2007 |
| JP | 2007-240202 | 9/2007 |
| JP | 2008-180550 | 8/2008 |
| JP | 2008-264569 | 11/2008 |
| JP | 2008-286667 A | 11/2008 |
| JP | 2009-002911 A | 1/2009 |
| JP | 2009-222524 | 10/2009 |
| JP | 2009-250725 A | 10/2009 |
| JP | 2009-250931 A | 10/2009 |
| JP | 2010-537207 A | 12/2010 |
| JP | 2011/086479 | 4/2011 |
| JP | 2012-501446 A | 1/2012 |
| JP | 2012/15007 | 8/2012 |
| KR | 2012-0040247 A | 4/2012 |
| KR | 2013 0019872 A | 2/2013 |
| WO | WO 88/09026 | 11/1988 |
| WO | WO 93/12403 | 6/1993 |
| WO | WO 94/08203 | 4/1994 |
| WO | WO 94/29672 | 12/1994 |
| WO | WO 1995/18982 | 7/1995 |
| WO | WO 96/02849 A1 | 2/1996 |
| WO | WO 1999/49322 | 9/1999 |
| WO | WO 01/40790 | 6/2001 |
| WO | WO 01/74139 A2 | 10/2001 |
| WO | WO 01/74139 A3 | 10/2001 |
| WO | WO 03/069358 A2 | 8/2003 |
| WO | WO 03/069358 A3 | 8/2003 |
| WO | WO 03/107018 | 12/2003 |
| WO | WO 2004/027436 | 4/2004 |
| WO | WO 2004/072672 | 8/2004 |
| WO | WO 2005/013363 A2 | 2/2005 |
| WO | WO 2005/013363 A3 | 2/2005 |
| WO | WO 2006/035342 | 4/2006 |
| WO | WO 2006/056829 | 6/2006 |
| WO | WO 2006/083479 | 8/2006 |
| WO | WO 2007/095971 A1 | 8/2007 |
| WO | WO 2007/138508 | 12/2007 |
| WO | WO 2008/008140 A2 | 1/2008 |
| WO | WO 2008/008140 A3 | 1/2008 |
| WO | WO 2008/048379 | 4/2008 |
| WO | WO 2008/121443 | 10/2008 |
| WO | WO 2008/145662 | 12/2008 |
| WO | WO 2009/108422 A2 | 9/2009 |
| WO | WO 2009/108422 A3 | 9/2009 |
| WO | WO 2010/014309 | 2/2010 |
| WO | WO 2010/027658 A2 | 3/2010 |
| WO | WO 2010/065315 | 6/2010 |
| WO | WO 2010/096367 | 8/2010 |
| WO | WO 2011/011479 | 1/2011 |
| WO | WO 2012/148646 | 11/2012 |
| WO | WO 2013/169455 | 11/2013 |
| WO | WO 2014/105302 A1 | 7/2014 |
| WO | WO 2015/009442 A1 | 1/2015 |
| WO | WO 2015/058733 | 4/2015 |

OTHER PUBLICATIONS

Allegro "Two-Wire True Zero Speed Miniature Differential Peak-Detecting Gear Tooth Sensor;" ATS645LSH; 2004; Allegro MicroSystems, Inc., Worcester, MA 01615; 14 pages.

Allegro Microsystems, Inc., "Gear-Tooth Sensor For Automotive Applications," Aug. 3, 2001; 2 pages.

(56) References Cited

OTHER PUBLICATIONS

Allegro MicroSystems, Inc., Hall-Effect IC Applications Guide, http://www.allegromicro.com/en/Products/Design/an/an27701.pdf, Copyright 1987, 1997; 36 pages.
Alllegro "True Zero-Speed Low-Jitter High Accuracy Gear Tooth Sensor;" ATS625LSG; 2005; Allegro MicroSystems, Inc. Worcester, MA 01615; 21 pages.
Ausserlechner et al.; "Compensation of the Piezo-Hall Effect in Integrated Hall Sensors on (100)-Si;" IEEE Sensors Journal, vol. 7, No. 11; Nov. 2007; ISBN: 1530-437X; 8 pages.
Ausserlechner et al.; "Drift of Magnetic Sensitivity of Small Hall Sensors Due to Moisture Absorbed by the IC-Package;" Proceedings of IEEE Sensors, 2004; vol. 1; Oct. 24, 2004; ISBN:0-7803-8692-2; 4 pages.
Ausserlechner; "Limits of Offset Cancellation by the Principle of Spinning Current Hall Probe;" Proceedings of IEEE Sensors; Oct. 2004; 4 pages.
Ausserlechner; "The piezo-Hall effect in n-silicon for arbitrary crystal orientation;" Proceedings of IEEE Sensors; vol. 3; Oct. 24, 2004; ISBN: 0-7803-8692-2; 4 pages.
Bahreyni, et al.; "A Resonant Micromachined Magnetic Field Sensor;" IEEE Sensors Journal; vol. 7, No. 9, Sep. 2007; 9 pages.
Barrettino, et al.; "CMOS-Based Monolithic Controllers for Smart Sensors Comprising Micromembranes and Microcantilevers;" IEEE Transactions on Circuits and Systems-I Regular Papers vol. 54, No. 1; Jan. 2007; 12 pages.
Baschirotto et al.; "Development and Analysis of PCB Vector 2-D Magnetic Field Sensor System for Electronic Compass;" IEEE Sensors Journal vol. 6, No. 2; Apr. 2006; 7 pages.
Bilotti et al.; "Monolithic Magnetic Hall Sensor Using Dynamic Quadrature Offset Cancellation;" IEEE Journal of Solid-State Circuits; vol. 32, Issue 6; Jun. 1997; 8 pages.
Bowers et al., "Microfabrication and Process Integration of Powder-Based Permanent Magnets", Interdisciplinary Microsystems Group, Dept. Electrical and Computer Engineering, University of Florida, USA; Technologies for Future Micro-Nano Manufacturing Workshop, Napa, California, Aug. 8-10; 4 pages.
Daughton J: "Spin-dependent sensors", Proceedings of the IEEE New York, US, vol. 91. No. 5 May 1, 2003; 6 pages.
Demierre, et al.; "Reference Magnetic Actuator for Self-Calibration of a Very Small Hall Sensor Array;" Sensors and Actuators A97-98; Apr. 2002; 8 pages.
Dwyer, "Back-Biased Packaging Advances (SE, SG & SH versus SA & SB)," http://www.allegromicro.com/en/Products/Design/packaging_advances/index.asp, Copyright 2008; 5 pages.
Frick, et al.; "CMOS Microsystem for AC Current Measurement with Galvanic Isolation;" IEEE Sensors Journal; vol. 3, No. 6; Dec. 2003; 9 pages.
Halg; "Piezo-Hall Coefficients of n-Type Silicon;" Journal of Applied Physics; vol. 64, No. 1; Jul. 1, 1988; 7 pages.
Honeywell International, Inc., "Hall Effect Sensing and Application," Micro Switch Sensing and Control, Chapter 3, http://content.honeywell.com/sensing/prodinfo/solidstate/technical/hallbook.pdf, date unavailable but believed to be before Jan. 2008; 11 pages.
Hosticka; "CMOS Sensor Systems;" Sensors and Actuators A66; Apr. 1998; 7 pages.
Infineon Product Brief, TLE 4941plusC, Differential Hall IC for Wheel Speed Sensing, Oct. 2010, www.infineon.com/sensors, 2 pages.
Johnson et al., "Hybrid Hall Effect Device," Appl. Phys. Lett., vol. 71, No. 7, Aug. 1997; 3 pages.
Kanda et al.; "The Piezo-Hall Effect in n-Silicon;" $22^{nd}$ International Conference on the Physics of Semiconductors; vol. 1, Jan. 1995; 4 pages.
Kapser et al.; "Integrated GMR Based Wheel Speed Sensor for Automotive Applications;" IEEE 2007 Conference on Sensors; Oct. 2007; 4 pages.
Kammerer et al.: "A Hall effect sensors network insensitive to mechanical stress;" Proceedings of IEEE Sensors; vol. 3, Oct. 2004; 4 pages.
Lagorce et al.; "Magnetic and Mechanical Properties of Micromachined Strontium Ferrite/Polyimide Composites;" Journal of Microelectromechanical Systems; vol. 6, No. 4; Dec. 1997; 15 pages.
Lequesne et al.; "High-Accuracy Magnetic Position Encoder Concept;" IEEE Transactions on Industry Applications; vol. 35, No. 3; May/Jun. 1999; 9 pages.
Magnani et al.; "Mechanical Stress Measurement Electronics Based on Piezo-Resistive and Piezo-Hall Effects;" $9^{th}$ International Conference on Electronics, Circuits and Systems 2002; vol. 1; SBN: 0-7803-7596-3; Dec. 2002; 4 pages.
Manic et al.; "Short and Long-Term Stability Problems of Hall Plates in Plastic Packages;" IEEE $38^{th}$ Annual International Reliability Physics Symposium; Apr. 2000; 6 pages.
Manic; "Drift in Silicon Integrated Sensors and Circuits Due to the Thermo-Mechanical Stresses;" Lausanne, École Polytechnique Federale De Lausanne 2000; 176 pages.
Melexis Microelectronic Systems, Hall Applications Guide, Section 3—Applications,1997; 48 pages.
Motz et al.; "An Integrated Magnetic Sensor with Two Continuous-Time ΔΣ-Converters and Stress Compensation Capability;" IEEE International Solid-State Circuits Conference; Digest of Technical Papers; Feb. 6, 2006; ISBN: 1-4244-0079-1; 7 pages.
Motz, et al.; "A Chopped Hall Sensor with Small Jitter and Programmable "True Power-On" Function;" IEEE Journal of Solid-State Circuits; vol. 40, No. 7; Jul. 2005; 8 pages.
Motz, et al.; "An Integrated Hall Sensor Platform Design for Position, Angle and Current Sensing;" IEEE Sensors 2006; Exco, Daegu, Korea / Oct. 22-25, 2006; 4 pages.
Munter; "A Low-offset Spinning-current Hall Plate;" Sensors and Actuators A21-A23; 1990; 4 pages.
Munter; "Electronic Circuitry for a Smart Spinning-current Hall Plate with Low Offset;" Sensors and Actuators A; Jun. 1991; 5 pages.
Oniku et al.; "High-Energy-Density Permanent Micromagnets Formed from Heterogeneous Magnetic Powder Mixtures;" IEEE $25^{th}$ International Conference on Micro Electro Mechanical Systems, Jan. 2012; 4 pages.
Park et al.; "Ferrite-Based Integrated Planar Inductors and Transformers Fabricated at Low Temperature;" IEEE Transactions on Magnetics; vol. 33; No. 5; Sep. 1997; 3 pages.
Park et al.;"Batch-Fabricated Microinductors with Electroplated Magnetically Anisotropic and Laminated Alloy Cores", IEEE Transactions on Magnetics, vol. 35, No. 5, Sep. 1999, 10 pages.
Partin et al.; "Temperature Stable Hall Effect Sensors;" IEEE Sensors Journal, vol. 6, No. 1; Feb. 2006; 5 pages.
Pastre, et al.; "A Hall Sensor Analog Front End for Current Measurement with Continuous Gain Calibration;" IEEE Sensors Journal; vol. 7, No. 5; May 2007; 8 pages.
Pastre, et al.; "A Hall Sensor-Based Current Measurement Microsystem With Continuous Gain Calibration;" Research in Microelectronics and Electronics, IEEE vol. 2; Jul. 25; 2005; ISBN: 0-7803-9345-7; 4 pages.
Popovic; "Sensor Microsystems;" Proc. $20^{th}$ International Conference on Microelectronics (MWIL 95); vol. 2, NIS, Serbia, Sep. 12-14, 1995; 7 pages.
Randhawa; "Monolithic Integrated Hall Devices in Silicon Circuits;" Microelectronics Journal; vol. 12, No. 6; Sep. 14-17, 1981; 6 pages.
Ruther et al.; "Integrated CMOS-Based Sensor Array for Mechanical Stress Mapping;" 5th IEEE Conference on Sensors, Oct. 2007; 4 pages.
Ruther et al.; "Thermomagnetic Residual Offset in Integrated Hall Plates;" IEEE Sensors Journal; vol. 3, No. 6; Dec. 2003; 7 pages.
Sargent; "Switched-capacitor IC controls feedback loop;" EDN; Design Ideas; Feb. 17, 2000; 2 pages.
Schneider; "Temperature Calibration of CMOS Magnetic Vector Probe for Contactless Angle Measurement System," IEDM 1996 4 Pages.
Schott et al.; "Linearizing Integrated Hall Devices;" 1997 International Conference on Solid-State Sensors and Actuators, Jun. 16-19, 1997; 4 Pages.

(56) References Cited

OTHER PUBLICATIONS

Schott, et al.; "CMOS Single-Chip Electronic Compass with Microcontroller;" IEEE Journal of Solid-State Circuits; vol. 42, No. 12; Dec. 2007; 11 pages.
Simon et al.; "Autocalibration of Silicon Hall Devices;" $8^{th}$ International Conference on Solid-State Sensors and Actuators; vol. 2; Jun. 25, 1995; 4 pages.
Smith et al.; "Low Magnetic Field Sensing with GMR Sensors;" Sensor Magazine; Part 1; Sep. 1999; http://archives.sensorsmag.com/articles/0999/76mail.shtml; 8 pages.
Smith et al.; "Low Magnetic Field Sensing with GMR Sensors;" Sensor Magazine; Part 2; Oct. 1999; http://archives.sensorsmag.com/articles/1099/84/mail.shtml; 11 pages.
Steiner et al.; "Double-Hall Sensor with Self-Compensated Offset;" International Electron Devices Meeting; Dec. 7, 1997; ISBN: 0-7803-4100-7; 4 pages
Steiner et al; Offset Reduction in Hall Devices by Continuous Spinning Current Method; Sensors and Actuators A66; 1998; 6 pages.
Stellrecht et al.; Characterization of Hygroscopic Swelling Behavior of Mold Compounds and Plastic Packages; IEEE Transactions on Components and Packaging Technologies; vol. 27, No. 3; Sep. 2004; 8 pages.
Tian et al.; "Multiple Sensors on Pulsed Eddy-Current Detection for 3-D Subsurface Crack Assessment;" IEEE Sensors Journal, vol. 5, No. 1; Feb. 2005; 7 pages.
Trontelj et al; "CMOS Integrated Magnetic Field Source Used as a Reference in Magnetic Field Sensors on Common Substrate;" WEP 1-6; IMTC; May 1994; 3 pages.
Udo; "Limits of Offset Cancellation by the Principle of Spinning Current Hall Probe;" Proceedings of IEEE Sensors; Oct. 2004; 4 pages.
Wu, et al.; "A Chopper Current-Feedback Instrumentation Amplifier with a 1mHz 1/fNoise Corner and an AC-Coupled Ripple-Reduction Loop;" IEEE International Solid-State Circuits Conference; Feb. 10, 2009; 3 pages.
Zou et al.; "Three-Dimensional Die Surface Stress Measurements in Delaminated and Non-Delaminated Plastic Packages;" 48th Electronic Components and Technology Conference; May 25, 1998; 12 pages.
Office Action in U.S. Appl. No. 13/468,478 dated Jan. 15, 2014, 36 pages.
Response to U.S. Non-Final Office Action dated Jan. 15, 2014 for U.S. Appl. No. 13/468,478; Response filed on Jun. 12, 2014; 11 Pages.
U.S. Final Office Action dated Jul. 17, 2014 for U.S. Appl. No. 13/468,478; 13 Pages.
Response and RCE to U.S. Final Office Action dated Jul. 17, 2014 for U.S. Appl. No. 13/468,478; Response Filed Jan. 19, 2015; 12 Pages.
U.S. Non-Final Office Action dated Feb. 12, 2015 for U.S. Appl. No. 13/468,478; 14 Pages.
Response to U.S. Non-Final Office Action dated Feb. 12, 2015 for U.S. Appl. No. 13/468,478; Response filed Jun. 18, 2015; 11 Pages.
U.S. Final Office Action dated Sep. 16, 2015 for U.S. Appl. No. 13/468,478; 19 Pages.
Response (with RCE) to U.S. Final Office Action dated Sep. 16, 2015 for U.S. Appl. No. 13/468,478; Response filed Jan. 14, 2016; 18 Pages.
U.S. Non-Final Office Action dated May 10, 2016 corresponding to U.S. Appl. No. 13/468,478; 20 Pages.
Response filed on Oct. 3, 2016 to the Office Action dated May 10, 2016; for U.S. Appl. No. 13/468,478; 17 pages.
U.S. Final Office Action dated Feb. 10, 2017 for U.S. Appl. No. 13/468,478; 27 Pages.
Response to U.S. Final Office Action dated Feb. 10, 2017 for U.S. Appl. No. 13/468,478; Response filed on May 3, 2017; 9 Pages.
Notice of Allowance dated May 15, 2017 for U.S. Appl. No. 13/468,478; 15 Pages.
Notice of Allowance dated Jul. 25, 2017 for U.S. Appl. No. 13/468,478; 10 Pages.
PCT International Search Report and Written Opinion dated Jul. 13, 2013 for International Application No. PCT/US2013/037065; 13 pages.
PCT International Preliminary Report on Patentability and Written Opinion of the ISA dated Nov. 20, 2014; For PCT Pat. App. No. PCT/US2013/037065; 11 pages.
European Communication under Rule 71(3) EPC, Intention to Grant dated Jun. 2, 2016 corresponding to European Application No. 13722619.7; 26 Pages.
European Response to Written Opinion filed on May 21, 2015; for European Pat. App. No. 13722619.7, 9 pages.
Decision to Grant dated Oct. 27, 2016; for European Pat. App. No. 13722619.7; 2 pages.
Japanese Office Action (with English Translation) dated Jan. 13, 2017 for Japanese Application No. 2015-511491; 14 Pages.
Response (with Amended Claims in English) to Japanese Office Action dated Feb. 13, 2017 for Japanese Application No. 2015-511491; Response filed on Apr. 11, 2017; 10 Pages.
Appeal Brief dated Sep. 19, 2017 from Japanese Application No. 2015-511491 with English translations; 14 Pages.
Pre-Trial Report dated Nov. 2, 2017 from Japanese Application No. 2015-511491 with English translations and Claims on File; 7 Pages.
Japanese Office Action (with English Translation) dated May 18, 2017 for Japanese Application No. 2015-511491; 8 Pages.
Japanese Petition (with Machine English Translation) filed Jan. 24, 2018 for Japanese Application No. 2015-511491; 10 Pages.
Japanese Office Action (with English Translation) dated May 16, 2018 for Japanese Application No. 2015-511491; 9 Pages.
Response filed on Nov. 14, 2018 for Japanese Application No. 2015-511491 with English Translation; 11 Pages.
Japanese Office Action dated Dec. 17, 2018 for Japanese Application No. 2015-511491; 10 pages.
Response filed on Mar. 14, 2019 for Japanese Application No. 2015-511491 with English Machine Translation; 12 Pages.
Japanese Notice of Allowance (with English Translation of Allowed Claims) dated May 16, 2019 for Japanese Application No. 2015-511491; 6 Pages.
Korean Office Action (with English Translation) dated Dec. 20, 2017 corresponding to Korean Appl. No. 10-2014-7032857; 14 Pages.
Response (with English Translation) to Korean Notice of Reasons for Refusal dated Dec. 20, 2017 for Korean Application No. 10-2014-7032857; Response filed Feb. 14, 2018; 47 Pages.
Korean Notice of Allowance (with English translation and allowed claims) dated Jun. 29, 2018 for Korean Application No. 10-2014-7032857; 8 pages.
U.S. Non-Final Office Action dated Jan. 9, 2018 corresponding to U.S. Appl. No. 15/709,739; 12 Pages.
Response to U.S. Non-Final Office Action dated Jan. 9, 2018 for U.S. Appl. No. 15/709,739; Response filed Jun. 25, 2018; 11 pages.
Office Action dated Oct. 25, 2018 for U.S. Appl. No. 15/709,739; 14 Pages.
Response to Office Action dated Oct. 25, 2018 for U.S. Appl. No. 15/709,739, filed Jan. 18, 2019; 10 Pages.
Non-Final Office Action dated Mar. 8, 2019 for U.S. Appl. No. 15/709,739; 15 Pages.
Response to U.S. Non-Final Office Action dated Mar. 8, 2019 for U.S. Appl. No. 15/709,739; Response filed Jun. 10, 2019; 15 Pages.
U.S. Final Office Action dated Sep. 19, 2019 for U.S. Appl. No. 15/709,739; 24 Pages.
Appeal Brief filed on Mar. 19, 2020 for U.S. Appl. No. 15/709,739; 18 Pages.
U.S. Non-Final Office Action dated Jul. 28, 2020 for U.S. Appl. No. 15/709,739; 19 Pages.
Response to Office Action filed on Nov. 12, 2020 for U.S. Appl. No. 15/709,739; 17 pages.
U.S. Final Office Action dated Mar. 2, 2021 for U.S. Appl. No. 15/709,739; 17 Pages.
Appeal Brief filed on Aug. 17, 2021 for U.S. Appl. No. 15/709,739; 15 Pages.

(56) References Cited

OTHER PUBLICATIONS

Examiner's Answer dated Dec. 22, 2021 for U.S. Appl. No. 15/709,739; 7 pages.
European Extended Search Report dated Dec. 22, 2016; for European Pat. App. No. 16193227.2; 11 pages.
Response to European Office Action filed on Oct. 2, 2017 for European Application No. 16193227.2; 7 pages.
European Examination Report dated May 15, 2020 for European Application No. 16193227.2; 8 Pages.
Response to European Office Action filed on Sep. 15, 2020 for European Application No. 16193227.2; 9 pages.
European Intention to Grant dated Mar. 10, 2021 for European Application No. 16193227.2; 7 Pages.
Japanese Office Action with English Translations for Japanese Application No. 2017-178549 dated Jul. 30, 2018; 4 Pages.
Response filed on Nov. 14, 2018 for Japanese Application No. 2017-178549 with English Translation; 13 Pages.
Notice of Allowance dated Apr. 16, 2019 for Japanese Application No. 2017-178549 with English Translation of Allowed claims; 8 Pages.
Office Action dated Jan. 5, 2015 for U.S. Appl. No. 13/946,400; 56 Pages.
Response to Office Action dated Jan. 5, 2015, filed Apr. 3, 2015; for U.S. Appl. No. 13/946,400; 13 pages.
Final Office Action dated Jun. 9, 2015; for U.S. Appl. No. 13/946,400; 17 pages.
Amendment and RCE filed on Sep. 9, 2015; for U.S. Appl. No. 13/946,400; 12 pages.
Office Action dated Nov. 19, 2015; for U.S. Appl. No. 13/946,400; 24 pages.
Response to U.S. Non-Final Office Action dated Nov. 19, 2015 for U.S. Appl. No. 13/946,400; Response filed Feb. 17, 2016; 11 Pages.
Final Office Action dated Oct. 20, 2016 for U.S. Appl. No. 13/946,400; 34 pages.
Response to Final Office Action dated Oct. 20, 2016, filed on Jan. 19, 2017; for U.S. Appl. No. 13/946,400; 12 Pages.
Response to U.S. Final Office Action dated Oct. 20, 2016 (w/RCE) for U.S. Appl. No. 13/946,400; Response filed on Feb. 23, 2017; 17 Pages.
Advisory Action dated Feb. 16, 2017 for U.S. Appl. No. 13/946,400; 4 Pages.
Office Action dated Apr. 6, 2017 for U.S. Appl. No. 13/946,400; 36 Pages.
Response to Office Action filed on Jun. 30, 2017 for U.S. Appl. No. 13/946,400; 12 pages.
Final Office Action dated Oct. 5, 2017 for U.S. Appl. No. 13/946,400; 39 pages.
Response to U.S. Final Office Action dated Oct. 5, 2017 for U.S. Appl. No. 13/946,400; Response filed Jan. 5, 2018; 11 Pages.
Response to Final Office Action dated Oct. 5, 2017 for U.S. Appl. No. 13/946,400; Response filed on Feb. 27, 2018;14 Pages.
Notice of Allowance dated Apr. 4, 2018 for U.S. Appl. No. 13/946,400; 11 pages.
International Search Report and Written Opinion dated Nov. 3, 2014 for Int'l PCT Application PCT/US2014/044993; 13 pages.
International Preliminary Report on Patentability dated Jan. 19, 2016 for Int'l PCT Application PCT/US2014/044993; 9 pages.
Communication Pursuant to Rule 161(1) and 162 EPC dated Feb. 23, 2016; for European Pat. App. No. 14742423.8; 2 pages.
European Response filed on Aug. 24, 2016 to the official communication dated Feb. 23, 2016; for European Pat. App. No. 14742423.8; 13 pages.
Response (with Amended Claims) to European Examination Report dated Jan. 27, 2020 for European Application No. 14742423.8; Response Filed May 27, 2020; 10 Pages.
European Examination Report dated Jan. 27, 2020 for European Application No. 14742423.8; 7 Pages.
Japanese Voluntary Amendment with English Claims dated Dec. 28, 2016; for Japanese Pat. App. No. 2016-528006; 8 pages.
Response to Japanese Office Action (with English claims) dated Oct. 3, 2017 for Japanese Application No. 2016-528006; Response filed Dec. 26, 2017; 8 Pages.
Japanese Office Action (with English translation) dated Jun. 1, 2018 for Japanese Application No. 2016-528006; 7 pages.
Response to Japanese Office Action with English translations of Amended Claims for Japanese Application No. 2016-528006 as filed on Aug. 3, 2018; 7 Pages.
Japanese Notice of Allowance (with English Translation) dated Sep. 28, 2018, for Japanese Application No. 2016-528006; 6 Pages.
Voluntary Amendment dated Nov. 2, 2016 with English claims for Chinese Application No. 201480040243.6; 13 pages.
Chinese Office Action (w/English Translation) dated Feb. 1, 2018 for Chinese Application No. 201480040243.6; 26 Pages.
Response to Chinese Office Action dated Feb. 1, 2018 for Chinese Application No. 201480040243.6; Response filed Jun. 14, 2018; 11 pages.
Second Office Action dated Oct. 9, 2018 for Chinese Application No. 201480040243.6 with English Translations; 23 Pages.
Chinese Response (w/English Claims and Remarks) filed Dec. 24, 2018 for Chinese Application No. 201480040243.6; 14 pages.
Office Action dated Mar. 22, 2019 for Chinese Application No. 201480040243.6 with English Translation; 22 Pages.
Response filed on Jun. 6, 2019 for Chinese Application No. 201480040243.6; 17 Pages.
Chinese Decision on Rejection (with English Translation) dated Sep. 3, 2019 for Chinese Application No. 201480040243.6; 23 Pages.
Response with English Translation and Amended Claims in English to Chinese Office Action dated Sep. 3, 2019 for Chinese Application No. 2014800402436; Response filed on Dec. 17, 2019; 17 Pages.
Chinese Notice of Grant (with English Translation and Allowed Claims) dated Jan. 9, 2020 for Chinese Application No. 201480040243.6; 11 Pages.
Voluntary Amendment with English Claims dated Nov. 7, 2016 for Korean App. No. 10-2016-7004178; 11 Pages.
Korean Office Action with English Translation dated Nov. 22, 2017 for Korean Application No. 102016-7004178; 17 Pages.
Korean Response (with English Language Summary) dated Jan. 19, 2018 for Korean Application No. 10-2016-7004178; 25 Pages.
Korean Office Action (with English Translation) dated May 30, 2018 for Korean Application No. 10-2016-7004178; 11 Pages.
Response to Korean Office Action dated May 30, 2018 for Korean Application No. 10-2016-7004178; Response (with English claims) filed Jul. 19, 2018; 41 pages.
Korean Notice of Allowance (with English Translation) dated Oct. 2, 2018, for Korean Application No. 10-2016-7004178; 5 Pages.
U.S. Non-Final Office Action dated Oct. 5, 2018, for U.S. Appl. No. 16/029,826; 61 Pages.
Response to U.S. Non-Final Office Action dated Oct. 5, 2018 for U.S. Appl. No. 16/029,826; Response filed Feb. 1, 2019; 10 pages.
U.S. Non-Final Office Action dated Nov. 29, 2019 for U.S. Appl. No. 16/029,826; 30 Pages.
Response to Office Action dated Jan. 17, 2020 for U.S. Appl. No. 16/029,826; 14 pages.
U.S. Final Office Action dated Sep. 19, 2019 for U.S. Appl. No. 16/029,826; 22 Pages.
Response to U.S. Final Office Action dated Sep. 19, 2019 for U.S. Appl. No. 16/029,826; Response filed Oct. 21, 2019; 12 Pages.
U.S. Notice of Allowance dated Mar. 23, 2020 for U.S. Appl. No. 16/029,826; 13 Pages.
U.S. Non-Final Office Action dated Feb. 19, 2021 for U.S. Appl. No. 16/856,582; 37 Pages.
Response to U.S. Non-Final Office Action dated Feb. 19, 2021 for U.S. Appl. No. 16/856,582; Response Filed Mar. 2, 2021; 11 Pages.
Examiner's Notice dated May 28, 2021 for U.S. Appl. No. 16/856,582; 2 Pages.
Response to U.S. Office Communication dated May 28, 2021 for U.S. Appl. No. 16/856,582; Response filed Jun. 3, 2021; 11 Pages.
U.S. Final Office Action dated Sep. 14, 2021 for U.S. Appl. No. 16/856,582; 21 Pages.
Response to Office Action dated Sep. 14, 2021 filed on Dec. 14, 2021 for U.S. Appl. No. 16/856,582; 13 pages.

(56) References Cited

OTHER PUBLICATIONS

U.S. Non-Final Office Action dated Aug. 24, 2015 for U.S. Appl. No. 13/891,519; 14 pages.
Response to U.S. Non-Final Office Action dated Aug. 24, 2015 for U.S. Appl. No. 13/891,519; Response filed on Nov. 20, 2015; 11 pages.
U.S. Final Office Action dated Feb. 16, 2016 for U.S. Appl. No. 13/891,519; 14 pages.
Response and RCE to U.S. Final Office Action dated Feb. 16, 2016 for U.S. Appl. No. 13/891,519; Response filed on May 12, 2016; 16 pages.
U.S. Non-Final Office Action dated Jun. 3, 2016 for U.S. Appl. No. 13/891,519; 17 pages.
Response to U.S. Non-Final Office Action dated Jun. 3, 2016 for U.S. Appl. No. 13/891,519; Response filed on Sep. 1, 2016; 14 pages.
U.S. Final Office Action dated Nov. 25, 2016 for U.S. Appl. No. 13/891,519; 13 pages.
Response and RCE to U.S. Final Office Action dated Nov. 25, 2016 for U.S. Appl. No. 13/891,519; Response filed on Feb. 6, 2017; 18 pages.
Notice of Allowance dated Mar. 1, 2017 for U.S. Appl. No. 13/891,519; 7 pages.
Notice of Allowance dated Apr. 19, 2017 for U.S. Appl. No. 13/891,519; 11 pages.
PCT International Search Report and Written Opinion dated Sep. 12, 2014 for International Application No. PCT/US2014/035594; 16 pages.
PCT International Preliminary Report dated Nov. 19, 2015 for International Application No. PCT/US2014/035594; 13 pages.
Communication Pursuant to Rules 161(1) and 162 dated Nov. 12, 2015 for European Application No. 14726492.3-1560; 2 pages.
Response to Communication dated Dec. 11, 2015 for European Application No. 14726492.3-1560; 17 pages.
Intention of Grant dated May 27, 2019 for for European Application No. 14726492.3-1560; 7 pages.
Japanese Office Action dated Jan. 18, 2017 for Japanese Application No. 2016-512930; 7 pages.
Response to Japanese Office Action dated Jan. 18, 2017 for Japanese Application No. 2016-512930; Response Filed Apr. 18, 2017; 13 pages.
Japanese Decision of Grant dated Oct. 25, 2018 for Japanese Application No. 2016-512930; Response Filed Apr. 18, 2017; 27 pages.
Office Action dated Mar. 20, 2015; for U.S. Appl. No. 13/946,417; 54 pages.
Response filed on Jun. 19, 2015 to Office Action dated Mar. 20, 2015; for U.S. Appl. No. 13/946,417; 15 pages.
Final Office Action dated Aug. 28, 2015; for U.S. Appl. No. 13/946,417; 34 pages.
Response filed Nov. 9, 2015 to Final Office Action dated Aug. 28, 2015; For U.S. Appl. No. 13/946,417; 17 pages.
Non-Final Office Action dated Dec. 3, 2015; for U.S. Appl. No. 13/946,417; 29 pages.
Response filed Mar. 3, 2016 to Office Action dated Dec. 3, 2015; For U.S. Appl. No. 13/946,417; 17 pages.
Final Office Action dated Oct. 6, 2016; for U.S. Appl. No. 13/946,417; 45 pages.
Response and RCE to Oct. 6, 2016 Final Office Action from U.S. Appl. No. 13/946,417, filed Jan. 24, 2017; 14 Pages.
U.S. Non-Final Office Action dated Mar. 15, 2017 from U.S. Appl. No. 13/946,417; 43 Pages.
Response to U.S. Non-Final Office Action dated Mar. 15, 2017 for U.S. Appl. No. 13/946,417; Response filed on Jun. 14, 2017; 10 pages.
U.S. Final Office Action dated Sep. 8, 2017 for U.S. Appl. No. 13/946,417; 56 pages.
Response to Final Office Action dated Sep. 8, 2017 for U.S. Appl. No. 13/946,417; Response filed Nov. 29, 2017; 16 Pages.
U.S. Non-Final Office Action dated Feb. 8, 2018 for U.S. Appl. No. 13/946,417; 37 Pages.
Response to U.S. Non-Final Office Action dated Feb. 8, 2018 for U.S. Appl. No. 13/946,417; Response filed Apr. 19, 2018; 14 Pages.
U.S. Final Office Action dated Jun. 15, 2018 for U.S. Appl. No. 13/946,417; 33 Pages.
Response to Final Office Action dated Jun. 15, 2018 for U.S. Appl. No. 13/946,417, filed Sep. 14, 2018; 15 Pages.
U.S. Non-Final Office Action dated Feb. 7, 2019 for U.S. Appl. No. 13/946,417; 35 pages.
Response to U.S. Non-Final Office Action dated Feb. 7, 2019 for U.S. Appl. No. 13/946,417; Response filed Apr. 22, 2019; 14 pages.
U.S. Notice of Allowance dated Sep. 11, 2019 for U.S. Appl. No. 13/946,417; 10 Pages.
U.S. Supplemental Notice of Allowability dated Oct. 2, 2019 for U.S. Appl. No. 13/946,417; 7 Pages.
International Search Report and Written Opinion dated Oct. 28, 2014 for Int'l PCT Application PCT/US2014/044991; 12 pages.
PCT International Preliminary Report and Written Opinion dated Jan. 28, 2016 for International Application No. PCT/US2014/044991; 9 pages.
U.S. Non-Final Office Action dated Jan. 24, 2019 for U.S. Appl. No. 15/606,358; 27 pages.
Response to Non-Final Office Action dated Jan. 24, 2019 for U.S. Appl. No. 15/606,358, filed Apr. 17, 2019; 12 Pages.
Non-Final Office Action dated Aug. 22, 2019 for U.S. Appl. No. 15/606,358; 32 Pages.
Response to U.S. Non-Final Office Action dated Aug. 22, 2019 for U.S. Appl. No. 15/606,358; Response filed Dec. 4, 2019; 20 Pages.
U.S. Final Office Action dated Mar. 6, 2020 for U.S. Appl. No. 15/606,358; 43 Pages.
Response to U.S. Final Office Action dated Mar. 6, 2020 for U.S. Appl. No. 15/606,358; Response filed Jul. 1, 2020; 16 Pages.
U.S. Notice of Allowance dated Feb. 16, 2021 for U.S. Appl. No. 15/606,358; 10 Pages.
PCT International Search Report and Written Opinion dated Nov. 23, 2018 for International Application No. PCT/US2018/028475; 17 pages.
PCT International Preliminary Report dated Dec. 5, 2019 for International Application No. PCT/US2018/028475; 11 Pages.
Communication pursuant to Rules 161(1) and 162 EPC dated Jan. 10, 2020 for European Application No. 18723635.1; 3 pages.
Response to European Rules 161/162 Communication dated Jan. 10, 2020 for European Application No. 18723635.1; Response filed Jul. 17, 2020; 18 Pages.
Japanese Office Action with English translation dated Dec. 1, 2021 for Japanese Application No. 2019-565299; 8 pages.
Chinese Office Action with English Translation dated Jun. 2, 2021 for Chinese Application No. 201880034849.7; 29 Pages.
Response (with English Translation) to $1^{st}$ Chinese Office Action dated June 2, 2021 for Chinese Application No. 201880034849.7; Response filed on Jul. 30, 2021; 19 Pages.
$2^{nd}$ Chinese Office Action (with English Translation) dated Aug. 25, 2021 for Chinese Application No. 201880034849.7; 12 Pages.
Response (with English Translation) to $2^{nd}$ Chinese Office Action dated Aug. 25, 2021 for Chinese Application No. 201880034849.7; Response filed Sep. 28, 2021; 60 Pages.
Chinese Notice of Allowance (with English Translation and Allowed Claims) dated Oct. 18, 2021 for Chinese Application No. 201880034849.7; 9 Pages.
Restriction Requirement dated Jan. 10, 2019 for U.S. Appl. No. 15/606,332; 12 pages.
Response to Restriction Requirement dated Jan. 10, 2019 for U.S. Appl. No. 15/606,332; filed Mar. 6, 2019, 13 pages.
Final Office Action dated Nov. 27, 2019 for U.S. Appl. No. 15/606,332; 29 pages.
Response to Final Office Action dated Nov. 27, 2019 filed on Feb. 7, 2020 for U.S. Appl. No. 15/606,332; 19 pages.
Final Office Action dated Sep. 17, 2020 for U.S. Appl. No. 15/606,332; 21 pages.
Response to Final Office Action dated Sep. 17, 2020 filed on Dec. 2, 2020 for U.S. Appl. No. 15/606,332; 23 pages.

(56) References Cited

OTHER PUBLICATIONS

Office Action dated Mar. 24, 2021 for U.S. Appl. No. 15/606,332; 23 pages.
Response to Office Action dated Mar. 24, 2021 filed on Jun. 24, 2021 for U.S. Appl. No. 15/606,332; 21 pages.
PCT International Search Report and Written Opinion of the ISA dated Aug. 10, 2018 for PCT/US2018/028816; 23 Pages.
PCT International Preliminary Report dated Dec. 5, 2019 for International Application No. PCT/US2018/028816; 18 Pages.
Communication pursuant to Rules 161(1) and 162 EPC dated Jan. 10, 2020 for European Application No. 18726263.9; 3 pages.
Response to European Rules 161/162 Communication dated Jan. 10, 2020 for European Application No. 18726263.9; Response filed Jul. 10, 2020; 18 Pages.
European Examination Report dated Aug. 5, 2021 for European Application No. 18726263.9; 4 Pages.
Chinese Office Action (with English Translation) dated Mar. 3, 2021 for Chinese Application No. 201880034743.7; 22 Pages.
Response to Chinese Office Action dated Mar. 3, 2021 for Chinese Application No. 201880034743.7; Response filed on Jul. 16, 2021; 23 Pages.
$2^{nd}$ Chinese Office Action (with English Translation) dated Oct. 9, 2021 for Chinese Application No. 201880034743.7; 19 Pages.
Response to Chinese Office Action dated Oct. 9, 2021 filed on Dec. 31, 2021 (with English translation) for Chinese Application No. 201880034743.7; 20 Pages.
Japanese Office Action with English translation dated Dec. 1, 2021 for Japanese Application No. 2019-565248; 14 pages.
Office Action dated Nov. 8, 2018 for U.S. Appl. No. 15/606,325; 24 Pages.
Response to Office Action dated Nov. 8, 2018 for U.S. Appl. No. 15/606,325; Response filed Feb. 7, 2019; 14 pages.
Final Office Action dated May 16, 2019 for U.S. Appl. No. 15/606,325; 24 Pages.
Response to Final Office Action dated May 16, 2019 for U.S. Appl. No. 15/606,325, filed Aug. 14, 2019; 15 Pages.
U.S. Notice of Allowance dated Jul. 28, 2020 for U.S. Appl. No. 15/606,325, 33 pages.
PCT International Search Report and Written Opinion dated Nov. 30, 2018 for International Application No. PCT/US2018/028821; 12 pages.
PCT International Preliminary Report dated Dec. 5, 2019 for International Application No. PCT/US2018/028821; 8 Pages.
Communication pursuant to Rules 161(1) and 162 EPC dated Jan. 10, 2020 for European Application No. 18723644.3; 3 pages.
Response to European Office Action filed on Jul. 17, 2020 for European Application No. 18723644.3; 17 pages.
Japanese Voluntary Amendment (with Machine English Translation from Espacenet.com) filed on Nov. 13, 2020 for Japanese Application No. 2019-565298; 4 Pages.
Japanese Office Action with English translation dated Nov. 2, 2021 for Japanese Application No. 2019-565298; 14 pages.
Chinese Office Action with English Translation dated Jun. 18, 2021 for Chinese Application No. 201880034726.3; 21 Pages.
Response (with English Translation) to $1S^t$ Chinese Office Action dated Jun. 18, 2021 for Chinese Application No. 201880034726.3; Response filed on Aug. 23, 2021; 18 Pages.
Chinese $2^{nd}$ Office Action (with English Translation) dated Oct. 21, 2021 for Chinese Application No. 201880034726.3; 10 Pages.
Chinese Response to Office Action with English translation filed on Dec. 31, 2021 for Chinese Application No. 201880034726.3; 33 pages.
Notice of Allowance dated Sep. 29, 2021 for U.S. Appl. No. 16/870,265; 10 pages.
Response (with Machine English Translation from Espacenet.com) to Japanese Office Action dated Dec. 1, 2021 for Japanese Application No. 2019-565248; Response filed Mar. 1, 2022; 25 Pages.
Request for Continued Examination (RCE) and Response to Final Office Action dated Feb. 8, 2022 for U.S. Appl. No. 15/606,332; RCE and Response filed Apr. 26, 2022; 24 Pages.
U.S. Notice of Allowance dated May 17, 2022 for U.S. Appl. No. 15/606,332; 11 Pages.
Response to European Examination Report dated Aug. 5, 2021 for European Application No. 18726263.9; Response filed May 6, 2022; 107 Pages.
Response (with English Translation) to $2^{nd}$ Chinese Office Action dated Oct. 9, 2021 for Chinese Application No. 201880034743.7; Response filed Dec. 23, 2021; 20 Pages.
Response to U.S. Non-Final Office Action dated Mar. 24, 2021 for U.S. Appl. No. 15/606,332; Response filed Jun. 24, 2021; 21 Pages.
U.S. Final Office Action dated Feb. 8, 2022 for U.S. Appl. No. 15/606,332; 22 Pages.
Chinese Notice of Granting a Patent (with English Translation and Allowed Claims) dated Feb. 11, 2022 for Chinese Application No. 201880034743.7; 13 Pages.
Korean Office Action (with Machine English Translation from Espacenet.com) dated Jun. 29, 2022 for Korean Application No. 10-2019-7035015; 6 Pages.
Response (with Machine English Translation from Espacenet.com) to Korean Office Action dated Jun. 29, 2022 for Korean Application No. 10-2019-7035015; Response filed on Aug. 12, 2022; 40 Pages.
Japanese Office Action (with Machine English Translation) dated Jul. 28, 2022 for Japanese Application No. 2019-565248; 8 Pages.

* cited by examiner

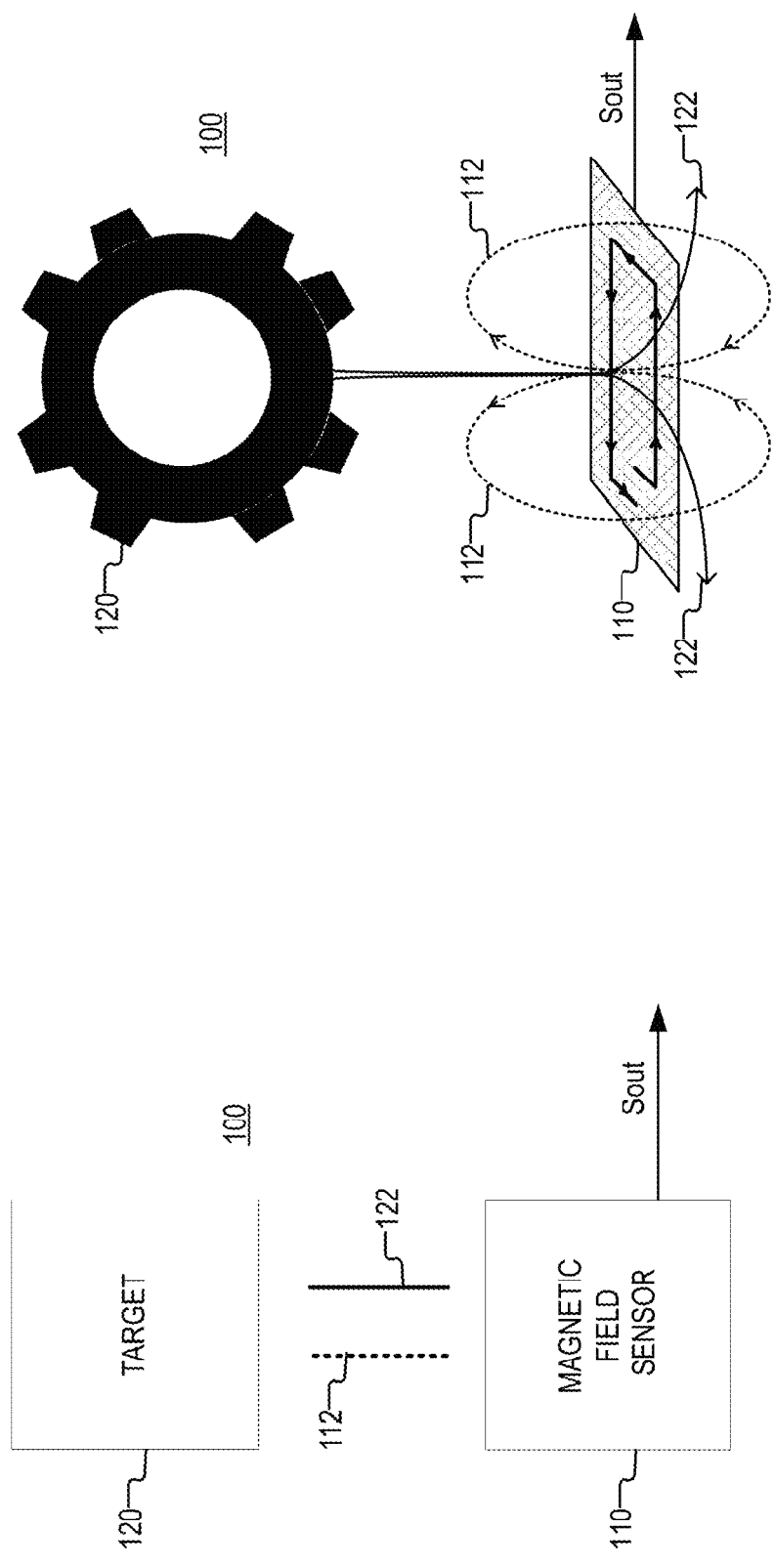

STRAY FIELD IMMUNE COIL-ACTIVATED SENSOR

BACKGROUND

Magnetic field sensors employ a variety of types of magnetic field sensing elements, for example, Hall effect elements and magnetoresistance elements, often coupled to a variety of electronics, all disposed over a common substrate. A magnetic field sensing element (and a magnetic field sensor) can be characterized by a variety of performance characteristics, one of which is a sensitivity, which can be expressed in terms of an output signal amplitude versus a magnetic field to which the magnetic field sensing element is exposed. Some magnetic field sensors can detect a linear motion of a target object. Some other magnetic field sensors can detect a rotation of a target object. The accuracy with which magnetic field sensors detect an intended magnetic field can be adversely affected by the presence of stray magnetic fields (i.e., fields other than those intended to be detected).

SUMMARY

According to aspects of the disclosure, a magnetic field sensor is provided comprising: a substrate; a transmission coil formed on the substrate, the transmission coil being configured to generate a direct magnetic field; a sensing bridge that is formed on the substrate, the sensing bridge being configured to detect the direct magnetic field and a reflected magnetic field that is generated by a target, the reflected magnetic field being generated in response to eddy currents that are induced in the target by the direct magnetic field; a processing circuitry being configured to generate an output signal that is indicative of a position of the target, the output signal being generated by normalizing a first signal with respect to a second signal, the first signal being generated at least in part by using the sensing bridge, and the second signal being generated at least in part by using the sensing bridge, wherein the second signal is based on the detected direct magnetic field.

According to aspects of the disclosure, a method is provided for use in a magnetic field sensor, comprising: generating a direct magnetic field by using a transmission coil that is formed on a substrate; generating a first signal and a second signal that are associated with the direct magnetic field and a reflected magnetic field, the reflected magnetic field being generated by a target in response to eddy currents that are induced in the target by the direct magnetic field; and generating an output signal that is indicative of a position of the target, the output signal being generated by normalizing the first signal with respect to the second signal, wherein the first signal and the second signal are generated by using a sensing bridge that is arranged to sense the reflected magnetic field.

According to aspects of the disclosure, a sensor is provided, comprising: a substrate; a transmission coil formed on the substrate, the transmission coil being configured to generate a direct magnetic field; a sensing bridge formed on the substrate, the sensing bridge being configured to detect a reflected magnetic field that is generated by a target, the reflected magnetic field being generated in response to eddy currents that are induced in the target by the direct magnetic field; and a processing circuitry being configured to generate an output signal that is indicative of a position of the target, the output signal being generated by normalizing at least one of: (i) a differential signal of the sensing bridge or (ii) an AC component of the differential signal with respect to a DC component of the differential signal.

According to aspects of the disclosure, a sensor is provided, comprising: a substrate; a transmission coil formed on the substrate, the transmission coil being configured to generate a direct magnetic field; a sensing bridge formed on the substrate, the sensing bridge being configured to detect a reflected magnetic field that is generated by a target, the reflected magnetic field being generated in response to eddy currents that are induced in the target by the direct magnetic field; and a processing circuitry being configured to generate an output signal that is indicative of a position of the target, the output signal being generated by normalizing at least one of: (i) a common-mode signal of the sensing bridge or (ii) an AC component of the common-mode signal with respect to a DC component of the differential signal.

BRIEF DESCRIPTION OF THE DRAWINGS

The foregoing features may be more fully understood from the following description of the drawings in which:

FIG. 1A is a diagram of an example of a magnetic field sensor system, according to aspects of the disclosure;

FIG. 1B is a diagram illustrating the operation of the magnetic field sensor system of FIG. 1A, according to aspects of the disclosure;

DETAILED DESCRIPTION

Figure 2A:
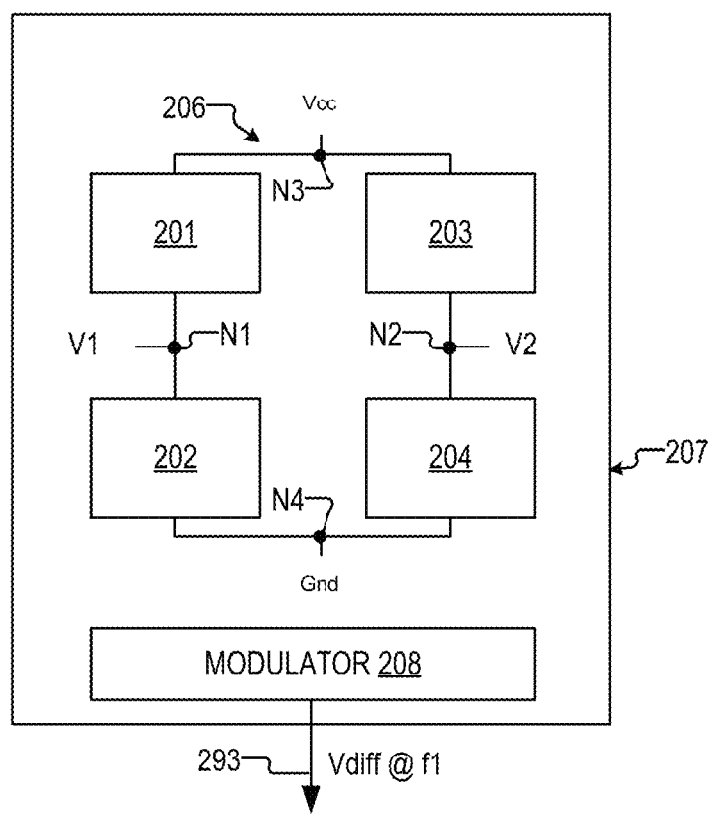
FIG. 2A is a diagram of an example of a sensing module, according to aspects of the disclosure.

FIG. 1A is a diagram of an example of a system 100, according to aspects of the disclosure. As illustrated, the system 100 may include a sensor 110 and a target 120. In operation, the sensor 110 may generate a direct magnetic field 112, as shown. The direct magnetic field 112 may induce eddy currents in the target 120. The eddy currents may generate a reflected magnetic field 122 in the target 120. The sensor 110 may detect the magnetic flux density of the reflected magnetic field 122 and determine the position of the target 120 based on the magnetic flux density of the reflected magnetic field 122. The sensor 110 may output a signal Sout that is indicative of the position of the target 120. By way of example, the signal Sout may identify a rotational displacement of the target 120. As another example, the signal Sout may identify the speed or direction of motion of the target 120. Stated succinctly, the present disclosure is not limited to any specific type of signal that indicates the position of the target 120.

Figure 2B:
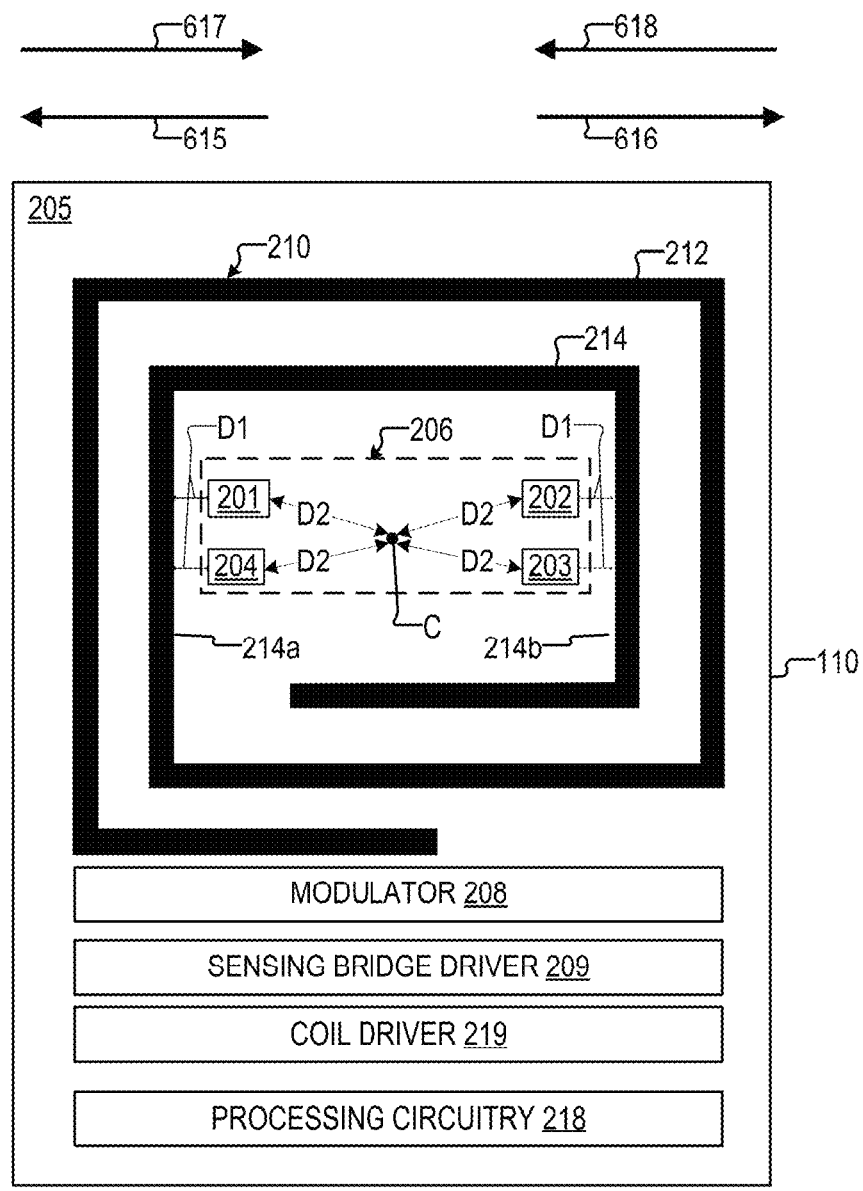
FIG. 2B is a diagram of an example of a magnetic field sensor, according to aspects of the disclosure.

FIG. 1B is a diagram illustrating the operation of the system 100 in further detail. FIG. 1B illustrates the orientation of the plane of the sensor 110 with respect to the target 120. The phrase "plane of a sensor", as used throughout the disclosure, shall refer to the plane of a major surface of a substrate on which the sensor is formed (e.g., see substrates 205, 305, and 405, which are shown in FIGS. 2B, 3B, and 4B, respectively). FIG. 1B further illustrates, that during normal operation, the sensor 110 may sense, at the same time, component(s) of the reflected magnetic field 122, as well as components of the direct magnetic field 112. The components of the direct magnetic field 112 that are sensed by the sensor 110 are herein referred to as "directly-coupled field". FIG. 2A is a diagram of an example of a sensing module 207, according to aspects of the disclosure. The sensing module 207 may include a sensing bridge 206 and a modulator 208. The sensing bridge 206 may include magnetic field sensing elements 201, 202, 203, and 204. Each of the magnetic field sensing elements may include a giant magnetoresistor (GMR), a tunnel magnetoresistor (TMR), a Hall element, and/or any other suitable type of sensing element. In operation, the bridge 206 may be configured to receive a voltage supply signal Vcc at a node N3 and a ground signal Gnd at a node N4. The sensing bridge 206 may be configured to output a voltage signal V1 at a node N1 and a voltage signal V2 at a node N2. The sensing bridge may be associated with a differential signal Vdiff that is defined by Equation 1 below:

$$Vdiff = V1 - V2 \qquad (1)$$

where V1 is the voltage at node N1 of the sensing bridge 206, and V2 is the voltage at node N2 of the sensing bridge 206. Throughout the disclosure, the terms "differential signal" and "differential voltage" are used interchangeably. The modulator 208, may be configured to modulate the signal Vdiff at a frequency f1. The modulator 208 may thus generate a signal 293, which is the differential signal Vdiff of the sensing bridge 206, modulated at frequency f1. The frequency f1 may be in the megahertz range.

FIG. 2B is a diagram illustrating one possible implementation of the sensor 110. The sensor 110 may include a substrate 205, the sensing bridge 206, the modulator 208, a sensing bridge driver 209, a transmission coil 210, a coil driver 219, and a processing circuitry 218. According to the example of FIG. 2B, each of the sensing bridge 206, the modulator 208, the sensing bridge driver 209, the transmission coil 210, the coil driver 219, and the processing circuitry 218 is formed on the substrate 205 of the sensor 110. However alternative implementations are possible in which one or more of the elements such as the processing circuitry 218, the coil driver 219, the sensing bridge driver 209 are provided separately. In some implementations, the sensor 110 can take the form of an integrated circuit and the substrate 205 can include one or more semiconductor substrates.

The sensing bridge driver 209 may include any suitable type of power circuit that is configured to supply the voltage signal Vcc and the ground signal Gnd to the sensing bridge 206 (e.g., see FIG. 2A). The coil driver 219 may include a power circuit that supplies alternating current to the transmission coil 210 to generate the direct magnetic field 112. The processing circuitry 218 may include any suitable type of electronic circuitry that is configured to generate the signal Sout (see FIGS. 1A-B). Examples of different implementations of the processing circuitry 218 are discussed further below with respect to FIGS. 2C-D.

The transmission coil 210, as noted above, may be configured to generate the direct magnetic field 112. The transmission coil 210 may include an outer turn 212 and an inner turn 214. According to the present example, the inner turn 214 is the innermost turn of the transmission coil 210, such that there are no other turns between the inner turn 214 and the center C of the transmission coil 210. Magnetic field sensing elements 201, 202, 203, and 204 may be disposed inside the inner turn 214, as shown. Specifically, each of the magnetic field sensing elements 201 and 204 may be separated by a distance D1 from a portion 214a of the inner turn 214. Each of the magnetic field sensing elements 203 and 202 may be separated by the distance D1 from a portion 214b of the inner turn 214. Furthermore, each of the magnetic field sensing elements 201, 202, 203, and 204 may be spaced apart from the center C of the inner turn 214 by a distance D2.

Arrow 615 indicates the direction of the component of the reflected magnetic field 122 that is sensed by magnetic field sensing elements 201 and 204. Arrow 616 indicates the direction of the component of the reflected magnetic field 122 that is sensed by magnetic field sensing elements 202 and 203. Arrow 617 indicates the direction of the component of the direct magnetic field 112 that is sensed by magnetic field sensing elements 201 and 204. Arrow 618 indicates the direction of the component of the direct magnetic field 112 that is sensed by magnetic field sensing elements 202 and 203. Each of the magnetic field components identified by the arrows 615-618 is substantially parallel to the plane of the sensor 110.

The differential signal Vdiff of the sensing bridge 206 may have an alternating current (AC) component and a direct current (DC) component. The DC component is generated in response to the DC directly-coupled field 112 that are incident on the sensing bridge 206 (but not in response to a stray field or the reflected magnetic field 122 presuming the target is moving). The AC component is generated in response to the reflected magnetic field 122, and/or AC stray magnetic fields that are incident on the sensing bridge 206. The spatial arrangement of the sensing elements 201-204 (shown in FIG. 2B) causes the AC and DC components of the differential signal Vdiff to drift or change in the same direction when the sensor 110 is exposed to the directly-coupled field 112 (and/or a stray field).

Figure 2C:
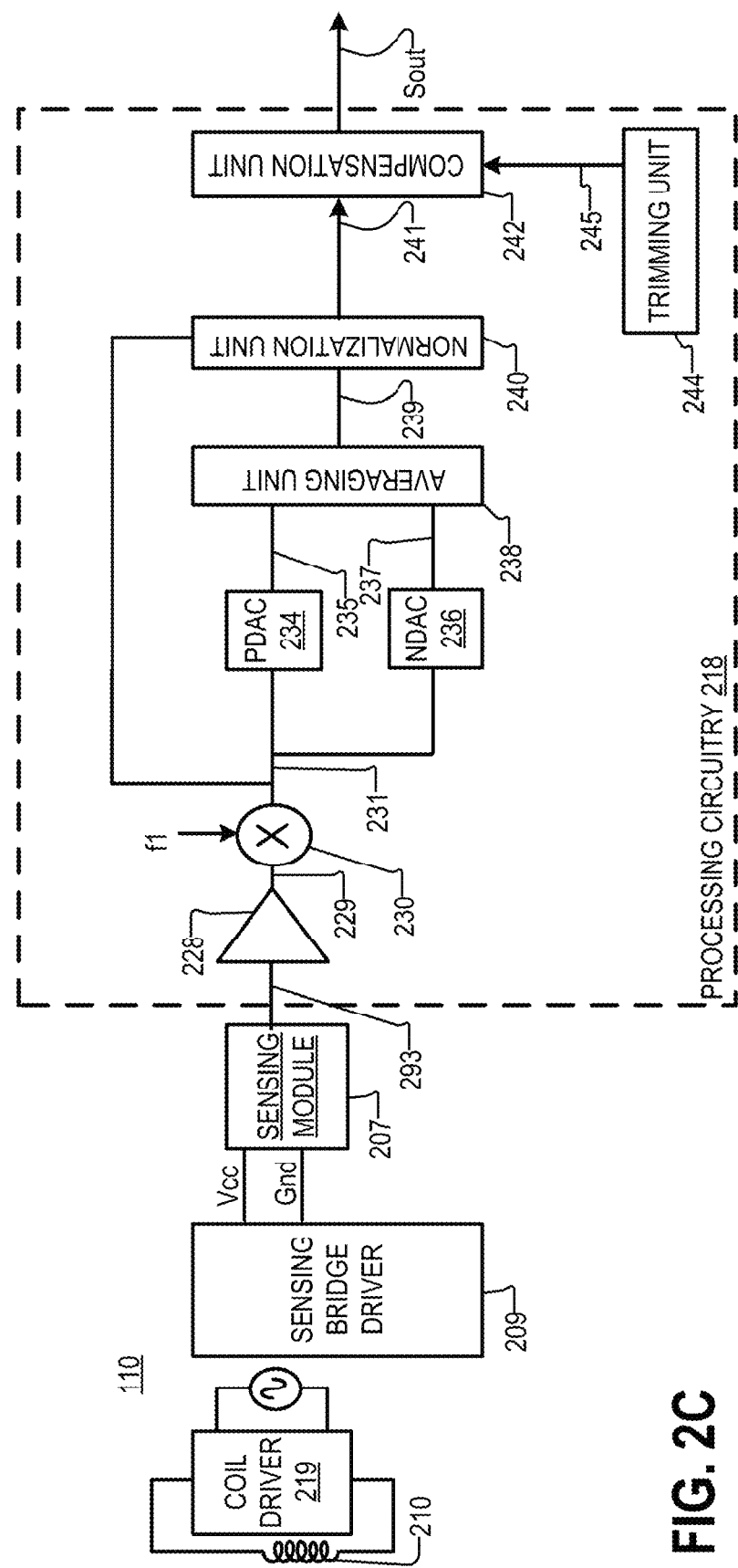
FIG. 2C is a diagram of an example of a magnetic field sensor, according to aspects of the disclosure.

FIG. 2C is a diagram of the sensor 110, according to aspects of the disclosure. FIG. 2C illustrates one possible implementation of the processing circuitry 218. In this implementation, the processing circuitry 218 includes an amplifier 228, a modulator 230, a positive peak detector (PDAC) 234, a negative peak detector (NDAC) 236, an averaging unit 238, a normalization unit 240, a compensation unit 242, and a trimming unit 244.

In operation, the transmission coil 210 may be powered by the coil driver 219 to generate the direct magnetic field 112. The sensing module 207 may be powered by the sensing bridge driver 209 to produce the signal 293. As noted above, the sensing module 207 may include the sensing bridge 206, and the signal 293 may be the differential voltage Vdiff of the sensing bridge 206, modulated at frequency f1. The amplifier 228 may amplify the signal 293 to produce a signal 229. The modulator 230 may demodulate the signal 229 to produce a signal 231. According to the present example, the signal 231 is the (amplified) differential signal Vdiff of the sensing bridge 206, at baseband.

The PDAC 234 may receive the signal 231 and generate a signal 235 that identifies the value (or level) of the most recent positive peak in the signal 231. The NDAC 236 may receive the signal 231 and generate a signal 237 that identifies the value (or level) of the most recent negative peak in the signal 231. The averaging unit 238 may receive the signals 235 and 237 and generate a signal 239. The signal 239 may be generated in accordance with Equation 2 below:

$$SIG_{239} = \frac{SIG_{235} + SIG_{237}}{2} \quad (2)$$

where $SIG_{239}$ is the signal 239, $SIG_{235}$ is the signal 235, and $SIG_{237}$ is the signal 237.

The normalization unit 240 may receive the signals 231 and 239 and generate a signal 241. The signal 241 may be generated by normalizing the signal 231 with respect to the signal 239. By way of example, the signal 241 may be generated in accordance with Equation 3 below:

$$SIG_{241} = \frac{SIG_{231} - SIG_{239}}{SIG_{231} + SIG_{239}} \quad (3)$$

where $SIG_{231}$ is the signal 231, $SIG_{329}$ is the signal 239, and $SIG_{241}$ is the signal 241.

The compensation unit 242 may generate the signal Sout based on the signal 241. In some implementations the compensation unit 242 may generate the signal Sout by linearizing the signal 241. Additionally or alternatively, in some implementations, the compensation unit 242 may generate the signal Sout by adjusting the gain and/or offset of the signal 241. The gain and/or offset of the signal 241 may be adjusted based on a signal 245, which is generated by the trimming unit 244. In some implementations, the signal 245 may be generated based on a signal provided by a temperature sensor, a stress sensor, or a humidity sensor. It will be understood that the present disclosure is not limited to any specific technique for adjusting the gain and/or offset of the signal 241.

Figure 2D:
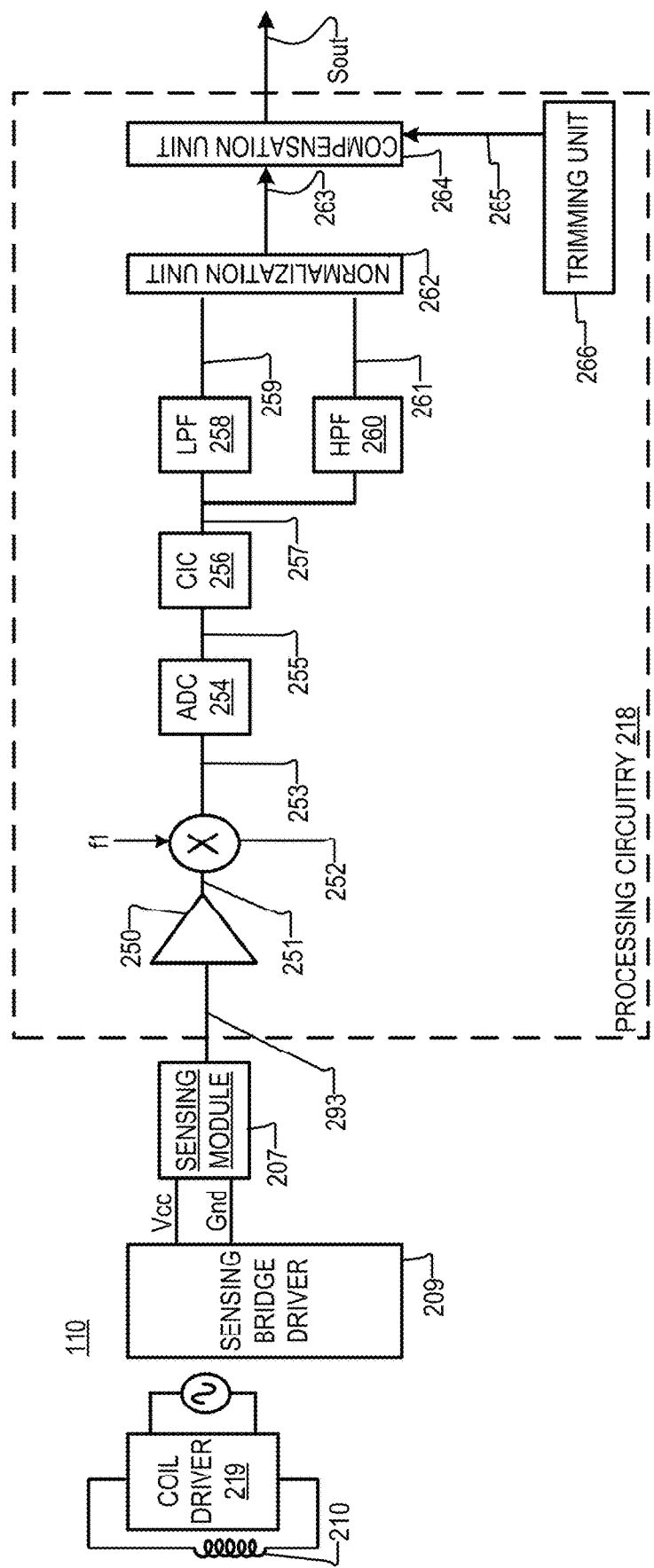
FIG. 2D is a diagram of an example of a magnetic field sensor, according to aspects of the disclosure.

FIG. 2D is a diagram of the sensor 110, according to aspects of the disclosure. FIG. 2D illustrates another possible implementation of the processing circuitry 218. In this implementation, the processing circuitry 218 includes an amplifier 250, a modulator 252, an analog-to-digital converter (ADC) 254, a cascaded integrator comb (CIC) filter 256, a low-pass filter (LPF) 258, a high-pass filter (HPF) 260, a normalization unit 262, a compensation unit 264, and a trimming unit 266.

In operation, the transmission coil 210 may be powered by the coil driver 219 to generate the direct magnetic field 112. The sensing module 207 may be powered by the sensing bridge driver 209 to produce the signal 293. As noted above, the sensing module 207 may include the sensing bridge 206, and the signal 293 may be the differential voltage Vdiff of the sensing bridge 206, modulated at frequency f1. The amplifier 250 may amplify the signal 293 to produce a signal 251. The modulator 252 may demodulate the signal 251, at the frequency f1, to produce a signal 253. The signal 253 is the (amplified) differential voltage Vdiff of the sensing bridge 206, at baseband.

The ADC 254 may digitize the signal 253 to produce a signal 255. The CIC filter 256 may filter the signal 255 to produce a signal 257. The LPF 258 may filter the signal 257 to produce a signal 259. The signal 259 may be equal to the DC component of the differential signal Vdiff of the sensing bridge 206. The HPF 260 may filter the signal 257 to produce a signal 261. The signal 261 may be equal to the AC component of the differential signal Vdiff.

The normalization unit 262 may receive the signals 259 and 261 and generate a signal 263. The signal 263 may be generated by normalizing the signal 261 with respect to the signal 259. In some implementations, the signal 263 may be generated in accordance with Equation 4 below:

$$SIG_{263} = \frac{SIG_{261} - SIG_{259}}{SIG_{261} + SIG_{259}} \quad (4)$$

where $SIG_{263}$ is the signal 263, $SIG_{261}$ is the signal 261, and $SIG_{259}$ is the signal 259.

The compensation unit 264 may generate the signal Sout based on the signal 263. In some implementations, the compensation unit 264 may generate the signal Sout by linearizing the signal 263. Additionally or alternatively, in some implementations, the compensation unit 264 may generate the signal Sout by adjusting the gain and/or offset of the signal 263. The gain and/or offset of the signal 263 may be adjusted based on a signal 265, which is generated by the trimming unit 266. In some implementations, the signal 265 may be generated based on a signal provided by a temperature sensor, a stress sensor, or a humidity sensor. It will be understood that the present disclosure is not limited to any specific technique for adjusting the gain and/or offset of the signal 263.

In some respects, the DC component of the differential signal Vdiff is generated in response to the directly-coupled DC field 112 that is sensed by the sensing bridge 206 and/or one or more stray magnetic fields (but not in response to the reflected magnetic field 122 presuming the target is moving). The AC component of the differential signal is generated in response to all AC magnetic fields that are sensed by the sensing bridge 206, such as the reflected magnetic field 122, etc. The signal Sout may be generated based on only a portion of the AC component of the differential signal Vdiff, which is generated in response to the reflected magnetic field 122. In this regard, FIGS. 2C-D provide examples of techniques for isolating the portion of the AC component that is generated in response to the reflected magnetic field 122. The isolation of the portion of the AC component that is generated in response to the reflected magnetic field 122 is made possible by the spatial arrangement of the sensing elements 201-204, relative to the transmission coil 210. As noted above, this spatial arrangement causes the AC and DC components of the differential signal Vdiff to drift in the same direction when the sensing bridge 206 is exposed to—a stray field. With this arrangement, detection of the direct magnetic field 112 can be used to normalize detection of the reflected magnetic field, thereby removing the effects of stray fields on target position detection.

In the technique described with respect to FIG. 2C, the DC component of the differential signal Vdiff is identified (or isolated) by taking the average of a positive peak of the signal Vdiff and a negative peak of the signal Vdiff. Afterwards, the differential signal Vdiff is normalized with respect to the DC component (i.e., the average of the positive and negative peaks) to yield the portion of the AC component that is generated in response to the reflected magnetic field only (i.e., the signal 241). The technique described with respect to FIG. 2C may be performed in either the analog domain or the digital domain and is not limited to the implementation of the processing circuitry 218 that is shown in FIG. 2C.

In the technique described with respect to FIG. 2D, the DC component of the differential signal Vdiff is identified (or isolated) by digitizing the differential signal Vdiff and running the differential signal Vdiff across a low-pass filter (i.e., LPF 258). Furthermore, the AC component of the differential signal Vdiff is identified (or isolated) by digitizing the differential signal Vdiff and running the differential signal Vdiff across a high-pass filter (i.e., LPF 258). Afterwards, the portion of the AC component (i.e., signal 263) that is generated in response to the reflected magnetic field 122 is isolated by normalizing the AC component with respect to the DC component. The technique described with respect to FIG. 2D may be performed in either the analog domain or the digital domain and is not limited to the implementation of the processing circuitry 218 that is shown in FIG. 2D.

Figure 3A:
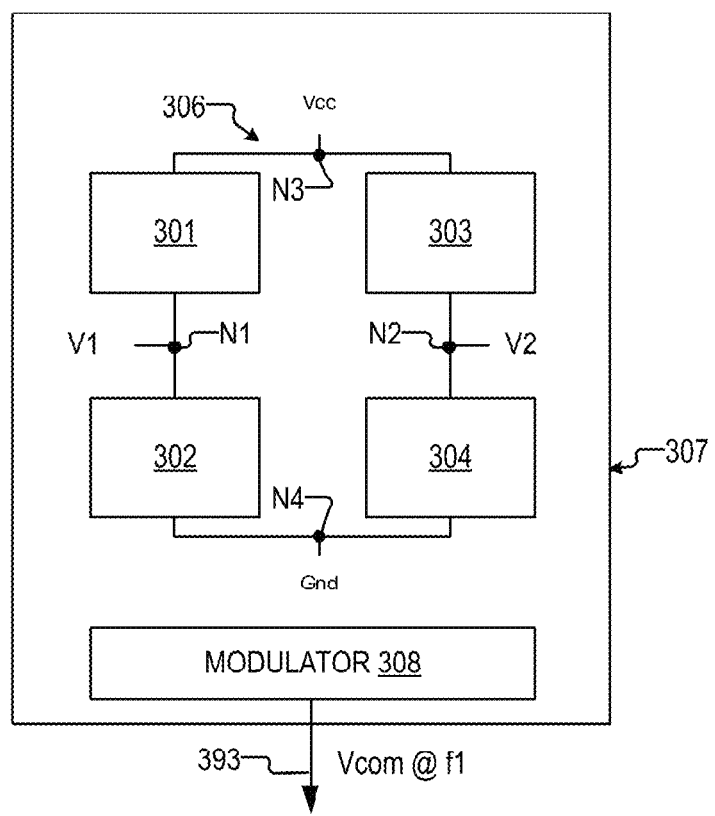
FIG. 3A is a diagram of an example of a sensing module, according to aspects of the disclosure.
Figure 3B:
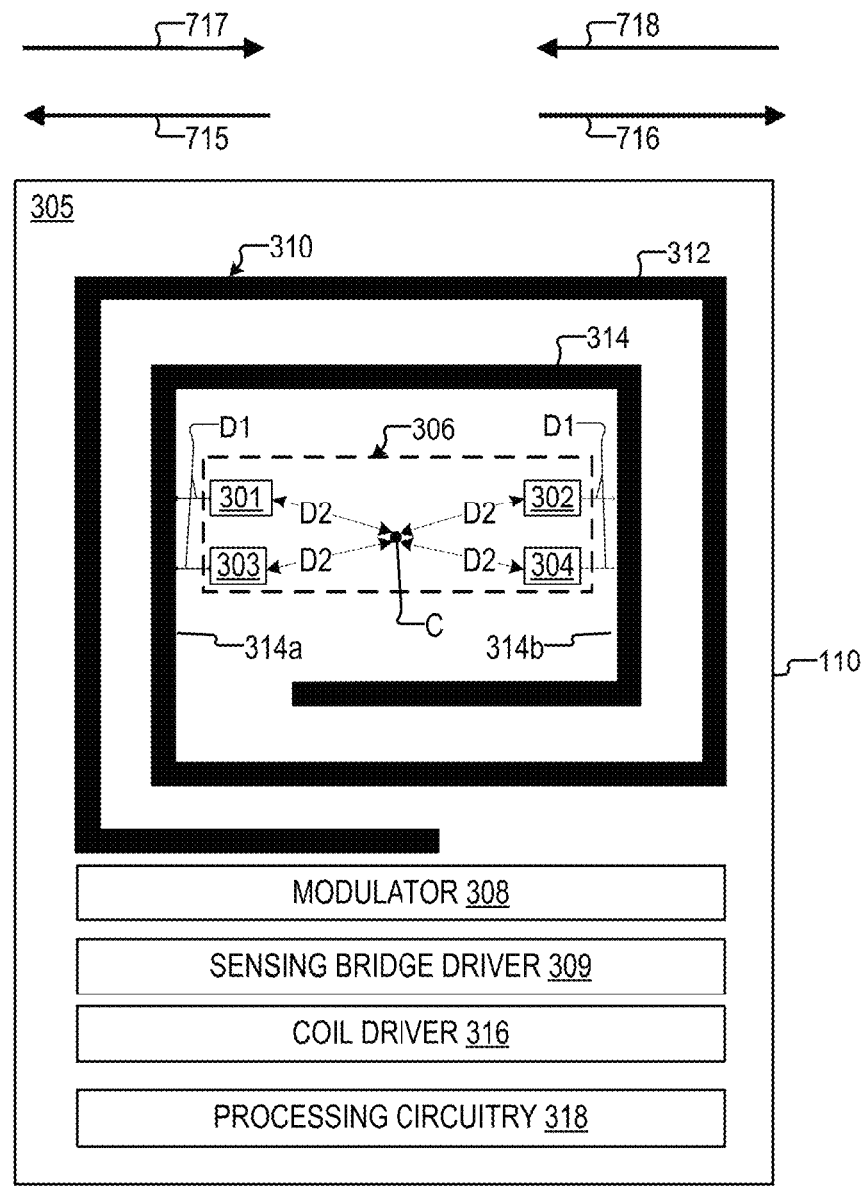
FIG. 3B is a diagram of an example of a magnetic field sensor, according to aspects of the disclosure.

FIG. 3A is a diagram of an example of a sensing module 307, according to aspects of the disclosure. The sensing module 307 may include a sensing bridge 306 and a modulator 308. The sensing bridge 306 may include magnetic field sensing elements 301, 302, 303, and 304. Each of the magnetic field sensing elements may include a giant magnetoresistor (GMR), a tunnel magnetoresistor (TMR), a Hall element, and/or any other suitable type of sensing element. In operation, the MR bridge 306 may be further configured to receive a voltage supply signal Vcc at a node N3 and a ground signal Gnd at a node N4. The sensing bridge 306 may be configured to output a voltage signal V1 at a node N1 and a voltage signal V2 at a node N2. The sensing bridge may be associated with a common-mode signal Vcom that is defined by Equation 5 below:

$$Vcom = \frac{(V1 + V2)}{2} \quad (5)$$

where V1 is the voltage at node N1 of the sensing bridge 306, and V2 is the voltage at node N2 of the sensing bridge 306. The modulator 308, may be configured to modulate the signal Vcom at a frequency f1. Throughout the disclosure, the terms "common-mode signal" and "common-mode voltage" are used interchangeably. The modulator 308 may thus generate a signal 393, which is the common-mode voltage Vcom of the sensing bridge 306, modulated at frequency f1. The frequency f1 may be in the megahertz range.

FIG. 3B is a diagram illustrating one possible implementation of the sensor 110. The sensor 110 may include a substrate 305, the sensing bridge 306, the modulator 308, a sensing bridge driver 309, a transmission coil 310, a coil driver 316, and a processing circuitry 318. According to the example of FIG. 3B, each of the sensing bridge 306, the modulator 308, the sensing bridge driver 309, the transmission coil 310, the coil driver 316, and the processing circuitry 318 is formed on the substrate 305 of the sensor 110. However alternative implementations are possible in which one or more of the elements such as the processing circuitry 318, the coil driver 316, the sensing bridge driver 309 are provided separately. In some implementations, the sensor 110 can take the form of an integrated circuit and the substrate 305 can include one or more semiconductor substrates.

The sensing bridge driver 309 may include any suitable type of power circuit that is configured to supply the voltage signal Vcc and the ground signal Gnd to the sensing bridge 306 (e.g., see FIG. 3A). The coil driver 316 may include a power circuit that supplies alternating current to the transmission coil 310 to generate the direct magnetic field 112. The processing circuitry 318 may include any suitable type of electronic circuitry that is configured to generate the signal Sout (see FIGS. 1A-B). Examples of different implementations of the processing circuitry 318 are discussed further below with respect to FIGS. 3C-D.

The transmission coil 310, as noted above, may be configured to generate the direct magnetic field 112. The transmission coil may include an outer turn 312 and an inner turn 314. According to the present example, the inner turn 314 is the innermost turn of the transmission coil 310, such that there are no other turns between the inner turn 314 and the center C of the transmission coil 310. Magnetic field sensing elements 301, 302, 303, and 304 may be disposed inside the inner turn 314, as shown. Specifically, each of the magnetic field sensing elements 301 and 303 may be separated by a distance D1 from a portion 314a of the inner turn 314. Each of the magnetic field sensing elements 302 and 304 may be separated by the distance D1 from a portion 314b of the inner turn 314. Furthermore, each of the magnetic field sensing elements 301, 304, 303, and 302 may be spaced apart from the center C of the inner turn 314 by a distance D2.

Arrow 715 indicates the direction of the component of the reflected magnetic field 122 that is sensed by magnetic field sensing elements 301 and 303. Arrow 716 indicates the direction of the component of the reflected magnetic field 122 that is sensed by magnetic field sensing elements 302 and 304. Arrow 717 indicates the direction of the component of the direct magnetic field 112 that is sensed by magnetic field sensing elements 301 and 303. Arrow 718 indicates the direction of the component of the direct magnetic field 112 that is sensed by magnetic field sensing elements 302 and 304. Each of the magnetic field components identified by the arrows 715-718 is substantially parallel to the plane of the sensor 110.

The common-mode signal Vcom of the sensing bridge 306 may have an alternating current (AC) component and a direct current (DC) component. The DC component is generated in response to the DC directly-coupled field 112 that are incident on the sensing bridge 306 (but not in response to the reflected magnetic field 122 presuming the target is moving). The AC component is generated in response to the reflected magnetic field 122, and/or that are incident on the sensing bridge 306. The spatial arrangement of the sensing elements 301-304 (shown in FIG. 3B) causes the AC and DC components of the common-mode signal Vcom to drift in the same direction when the sensor 110 is exposed to the directly-coupled field 112 (and/or a stray field).

Figure 3C:
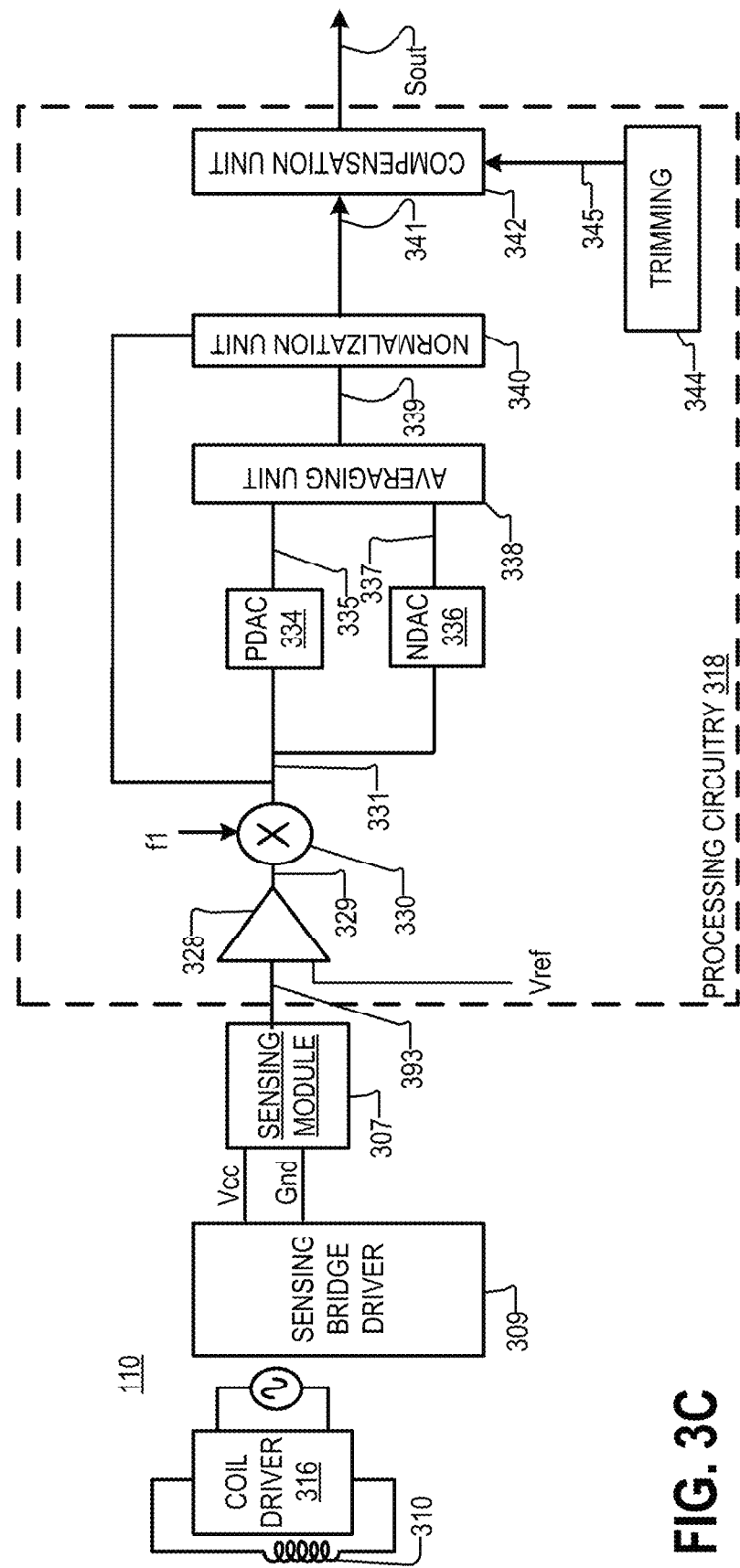
FIG. 3C is a diagram of an example of a magnetic field sensor, according to aspects of the disclosure.

FIG. 3C is a diagram of the sensor 110, according to aspects of the disclosure. FIG. 3C illustrates one possible implementation of the processing circuitry 318. In this implementation, the processing circuitry 318 includes an amplifier 328, a modulator 330, a positive peak detector (PDAC) 334, a negative peak detector (NDAC) 336, an averaging unit 338, a normalization unit 340, a compensation unit 342, and a trimming unit 344.

In operation, the transmission coil 310 may be powered by the coil driver 316 to generate the direct magnetic field 112 (shown in FIGS. 1A-B). The sensing module 307 may be powered by the sensing bridge driver 309 to produce the signal 393. As noted above, the sensing module 307 may include the sensing bridge 306, and the signal 393 may be the common-mode voltage Vcom of the sensing bridge 306, modulated at frequency f1. The amplifier 328 may receive the signal 393 and a signal Vref. The amplifier 328 may subtract the signal Vref from the signal 393 and amplify the resulting difference to produce a signal 329. The modulator 330 may demodulate the signal 329 to produce a signal 331. According to the present example, the signal Vref is equal to the common-mode voltage of the sensing bridge 306 when no magnetic fields are incident on the sensing bridge 306. In some implementations, VREF may be equal to zero. Alternatively, in some implementations, VREF may have a value that is different from zero. It will be understood that the present disclosure is not limited to any specific value of the signal Vref.

The PDAC 334 may receive the signal 331 and generate a signal 335 that identifies the value (or level) of the most recent positive peak in the signal 331. The NDAC 336 may receive the signal 331 and generate a signal 337 that identifies the value (or level) of the most recent negative peak in the signal 331. The averaging unit 338 may receive the signals 335 and 337 and generate a signal 339. The signal 339 may be generated in accordance with Equation 6 below:

$$SIG_{339} = \frac{SIG_{335} + SIG_{337}}{2} \qquad (6)$$

where $SIG_{339}$ is the signal 339, $SIG_{335}$ is the signal 335, and $SIG_{337}$ is the signal 337.

The normalization unit 340 may receive the signals 331 and 339 and generate a signal 341. The signal 341 may be generated by normalizing the signal 331 with respect to the signal 339. By way of example, the signal 341 may be generated in accordance with Equation 7 below:

$$SIG_{341} = \frac{SIG_{331} - SIG_{339}}{SIG_{331} + SIG_{339}} \qquad (7)$$

where $SIG_{331}$ is the signal 331, $SIG_{329}$ is the signal 329, and $SIG_{341}$ is the signal 341.

The compensation unit 342 may generate the signal Sout based on the signal 341. In some implementations the compensation unit 342 may generate the signal Sout by linearizing the signal 341. Additionally or alternatively, in some implementations, the compensation unit 342 may generate the signal Sout by adjusting the gain and/or offset of the signal 341. The gain and/or offset of the signal 341 may be adjusted based on a signal 345, which is generated by the trimming unit 344. In some implementations, the signal 345 may be generated based on a signal provided by a temperature sensor, a stress sensor, or a humidity sensor. It will be understood that the present disclosure is not limited to any specific technique for adjusting the gain and/or offset of the signal 341.

Figure 3D:
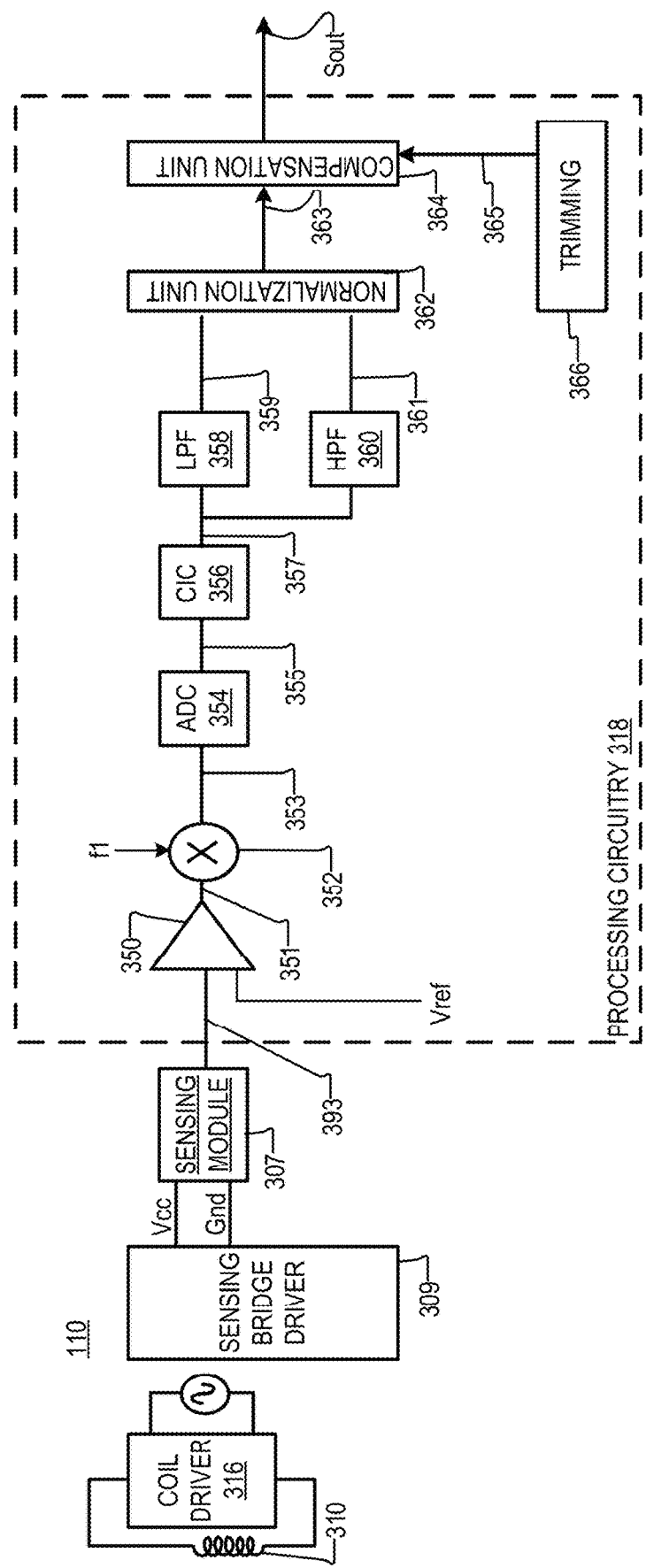
FIG. 3D is a diagram of an example of a magnetic field sensor, according to aspects of the disclosure.

FIG. 3D is a diagram of the sensor 110, according to aspects of the disclosure. FIG. 3D illustrates another possible implementation of the processing circuitry 318. In this implementation, the processing circuitry 318 includes an amplifier 350, a modulator 352, an analog-to-digital converter (ADC) 354, a cascaded integrator comb (CIC) filter 356, a low-pass filter (LPF) 358, a high-pass filter (HPF) 360, a normalization unit 362, a compensation unit 364, and a trimming unit 366.

In operation, the transmission coil 310 may be powered by the coil driver 316 to generate the direct magnetic field 112 (shown in FIGS. 1A-B). The sensing module 307 may be powered by the sensing bridge driver 309 to produce the signal 393. As noted above, the sensing module 307 may include the sensing bridge 306, and the signal 393 may be the common-mode voltage Vcom of the sensing bridge 306, modulated at frequency f1. The amplifier 350 may receive the signal 393 and a signal Vref. As noted above, the signal Vref is equal to the common-mode voltage of the sensing bridge 306 when no magnetic fields are incident on the sensing bridge 306. However, the present disclosure is not limited to any specific value of the signal Vref. The amplifier 350 may subtract the signal Vref from the signal 393 and amplify the resulting difference to produce a signal 351. The modulator 352 may demodulate the signal 351, at the frequency f1, to produce a signal 353.

The ADC 354 may digitize the signal 353 to produce a signal 355. The CIC filter 356 may filter the signal 355 to produce a signal 357. The LPF 358 may filter the signal 357 to produce a signal 359. The signal 359 may be equal to the DC component of the common-mode signal Vcom of the sensing bridge 306. The HPF 360 may filter the signal 357 to produce a signal 361. The signal 361 may be equal to the AC component of the common-mode signal Vcom.

The normalization unit 362 may receive the signals 359 and 361 and generate a signal 363. The signal 363 may be generated by normalizing the signal 361 with respect to the signal 359. In some implementations, the signal 363 may be generated in accordance with Equation 8 below:

$$SIG_{363} = \frac{SIG_{361} - SIG_{359}}{SIG_{361} \mp SIG_{359}} \qquad (8)$$

where $SIG_{363}$ is the signal 363, $SIG_{361}$ is the signal 361, and $SIG_{359}$ is the signal 359.

The compensation unit 364 may generate the signal Sout based on the signal 363. In some implementations, the compensation unit 364 may generate the signal Sout by linearizing the signal 363. Additionally or alternatively, in some implementations, the compensation unit 364 may generate the signal Sout by adjusting the gain and/or offset of the signal 363. The gain and/or offset of the signal 363 may be adjusted based on a signal 365, which is generated by the trimming unit 366 In some implementations, the signal 365 may be generated based on a signal provided by a temperature sensor, a stress sensor, or a humidity sensor. It will be understood that the present disclosure is not limited to any specific technique for adjusting the gain and/or offset of the signal 363.

In some respects, the DC component of the common-mode signal Vcom is generated in response to the directly-DC coupled field 112 that is sensed by the sensing bridge 306 that are incident on the sensing bridge 306 (but not in response to the reflected magnetic field 122 presuming that the target is moving). The AC component of the common-mode signal is generated in response to all AC magnetic fields that are sensed by the sensing bridge 306, such as the reflected magnetic field 122. The signal Sout may be generated based only on a portion of the AC component of the common-mode signal Vcom, which is generated in response to the reflected magnetic field 122. In this regard, FIGS. 3C-D provide examples of techniques for isolating the portion of the AC component that is generated in response to the reflected magnetic field 122. The isolation of the portion of the AC component that is generated in response to the reflected magnetic field 122 is made possible by the spatial arrangement of the sensing elements 301-304, relative to the transmission coil 310. This spatial arrangement causes the AC and DC components of the common-mode signal Vcom to drift in the same direction when the sensing bridge 306 is exposed to the directly-coupled field 112. With this arrangement, detection of the direct magnetic field 112 can be used to normalize detection of the reflected magnetic field, thereby removing the effects of stray fields on target position detection.

In the technique described with respect to FIG. 3C, the DC component of the common-mode signal Vcom is identified by taking the average of a positive peak of the signal Vcom and a negative peak of the signal Vcom. Afterwards, the common-mode signal Vcom is normalized with respect to the DC component (i.e., the average of the positive and negative peaks) to yield the portion of the AC component that is generated in response to the reflected magnetic field only (i.e., the signal 341). The technique described with respect to FIG. 3C may be performed in either the analog domain or the digital domain and is not limited to the implementation of the processing circuitry 318 that is shown in FIG. 3C.

In the technique described with respect to FIG. 3D, the DC component of the common-mode signal Vcom is identified by digitizing the common-mode signal Vcom and running the common-mode signal Vcom across a low-pass filter (i.e., LPF 358). Furthermore, the AC component of the common-mode signal Vcom is identified by digitizing the common-mode signal Vcom and running the common-mode signal Vcom across a high-pass filter (i.e., LPF 360). Afterwards, the portion of the AC component (i.e., signal 363) that is generated in response to the reflected magnetic field 122 is isolated by normalizing the AC component with respect to the DC component. The technique described with respect to FIG. 3D may be performed in either the analog domain or the digital domain and is not limited to the implementation of the processing circuitry 318 that is shown in FIG. 3D.

The techniques discussed with respect to FIGS. 3A-D use the common-mode voltage of a sensing bridge to determine the position of the target. This is in contrast to the techniques discussed with respect to FIGS. 2A-D, which use the differential voltage of a sensing bridge. It will be recalled that under the nomenclature of the present disclosure, the phrase "determining the position of a target" refers to determining any measure that is at least in part indicative of the position of the target, such as angular displacement, linear displacement, speed, direction of motion, etc.

Figure 4A:
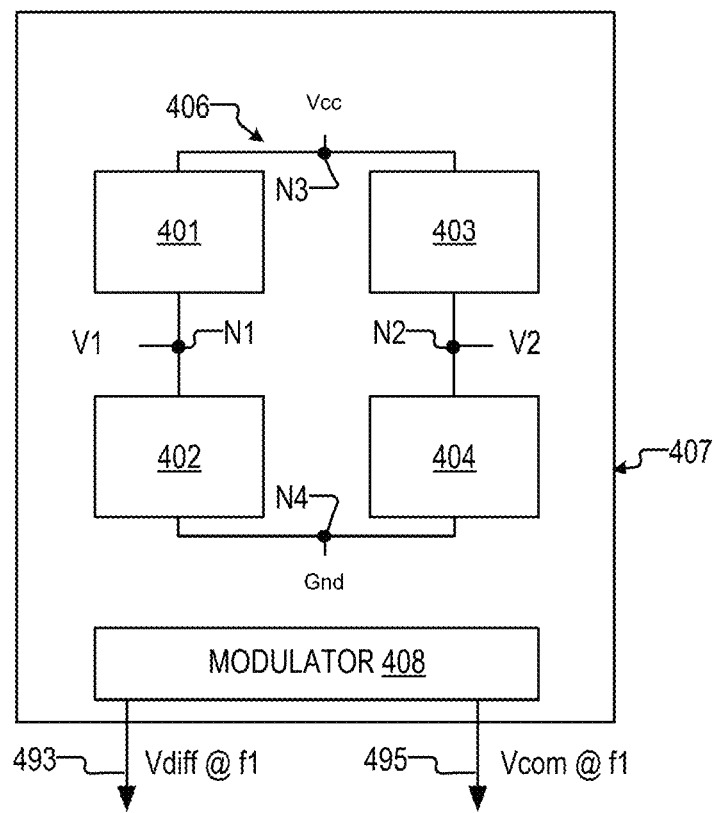
FIG. 4A is a diagram of an example of a sensing module, according to aspects of the disclosure.
Figure 4B:
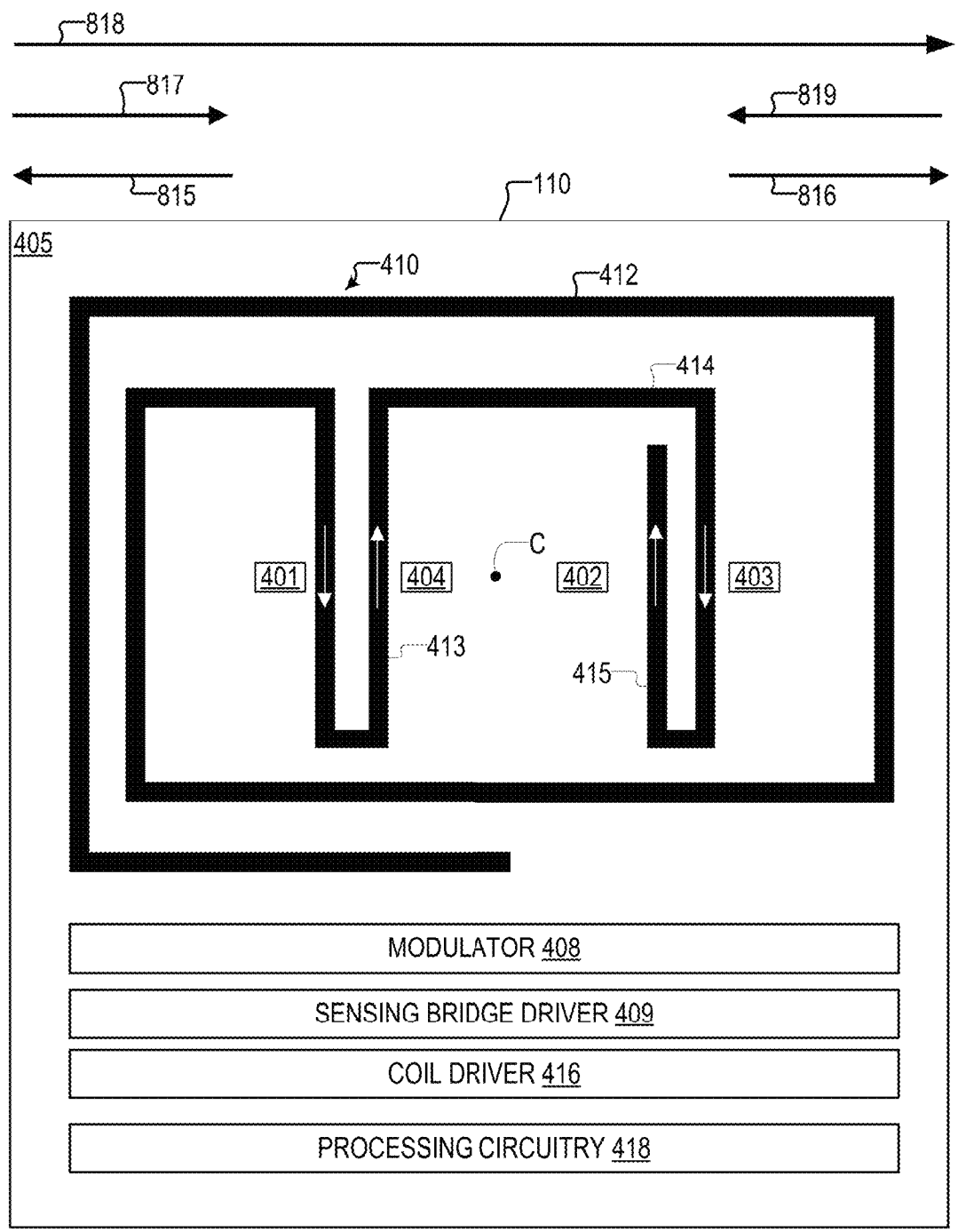
FIG. 4B is a diagram of an example of a magnetic field sensor, according to aspects of the disclosure.

FIG. 4A is a diagram of an example of a sensing module 407, according to aspects of the disclosure. The sensing module 407 may include a sensing bridge 406 and a modulator 408. The sensing bridge 406 may include magnetic field sensing elements 401, 402, 403, and 404. Each of the magnetic field sensing elements may include a giant magnetoresistor (GMR), a tunnel magnetoresistor (TMR), a Hall element, and/or any other suitable type of sensing element. In operation, the bridge 406 may be further configured to receive a voltage supply signal Vcc at a node N3 and a ground signal Gnd at a node N4. The sensing bridge 406 may be configured to output a signal V1 at a node N1 and a signal V2 at a node N2. The sensing bridge may be associated with a differential signal Vdiff and a common-mode signal Vcom, which are defined by Equations 9 and 10, respectively:

$$Vdiff = V1 - V2 \tag{9}$$

$$Vcom = \frac{(V1 + V2)}{2} \tag{10}$$

where V1 is the voltage at node N1 of the sensing bridge 406, and V2 is the voltage at node N2 of the sensing bridge 406. The modulator 408, may be configured to modulate the signal Vdiff at a frequency f1. The modulator 408 may thus generate a signal 493, which is the differential signal Vdiff of the sensing bridge 406, modulated at frequency f1. The modulator 408, may be further configured to modulate the signal Vcom at the frequency f1. The modulator 408 may thus generate a signal 495, which is the common-mode signal Vcom of the sensing bridge 406, modulated at frequency f1. The frequency f1 may be in the megahertz range.

FIG. 4B is a diagram illustrating one possible implementation of the sensor 110. The sensor 110 may include a substrate 405, the sensing bridge 406, the modulator 408, a sensing bridge driver 409, a transmission coil 410, a coil driver 416, and a processing circuitry 418. According to the example of FIG. 4B, each of the sensing bridge 406, the modulator 408, the sensing bridge driver 409, the transmission coil 410, the coil driver 416, and the processing circuitry 418 is formed on the substrate 405 of the sensor 110. However alternative implementations are possible in which one or more of the elements such as the processing circuitry 418, the coil driver 416, the sensing bridge driver 409 are provided separately. In some implementations, the sensor 110 can take the form of an integrated circuit and the substrate 405 can include one or more semiconductor substrates.

The sensing bridge driver 409 may include any suitable type of power circuit that is configured to supply the voltage signal Vcc and the ground signal Gnd to the sensing bridge 406 (e.g., see FIG. 2A). The coil driver 416 may include a power circuit that supplies alternating current to the transmission coil 410 to generate the direct magnetic field 112 (see FIGS. 1-B). The processing circuitry 418 may include any suitable type of electronic circuitry that is configured to generate the signal Sout (see FIGS. 1A-B). Examples of different implementations of the processing circuitry 418 are discussed further below with respect to FIG. 4C.

The transmission coil 410, as noted above, may be configured to generate the direct magnetic field 112. The transmission coil may include an outer turn 412 and an inner turn 414. In addition, the transmission coil may include counterturns 413 and 415, which are formed within the inner turn 414. The flow of current in the counterturn 413 is illustrated by the white arrows, which are superimposed on the counterturn 413. The flow of current in the counterturn 415 is illustrated by the white arrows, which are superimposed on the counterturn 415. According to the present example, the inner turn 414 is the innermost turn of the transmission coil 410, such that there are no other turns between the inner turn 414 and the center C of the transmission coil 410. Magnetic field sensing elements 401 and 404 may be disposed inside the inner turn 414, on opposite sides of the counterturn 413, as shown. Magnetic field sensing elements 402 and 403 may be disposed inside the inner turn 415, on opposite sides of the counterturn 415, as shown. Although in the example of FIG. 4B, the turn 414 is the innermost turn of coil 410, alternative implementations are possible in which the turn 414 is not the innermost turn of the coil 410. In such implementations, there may be one or more other turns disposed within the turn 414.

Arrow 815 indicates the direction of the component of the reflected magnetic field 122 that is sensed by magnetic field sensing elements 401 and 404. Arrow 816 indicates the direction of the component of the reflected magnetic field 122 that is sensed by magnetic field sensing elements 402 and 403. Arrow 817 indicates the direction of the component of the direct magnetic field 112 that is sensed by the magnetic field sensing elements 401 and 403 and arrow 819 indicates the direction of the component of the direct magnetic field that sensed by the sensing elements and 402 and 404. Arrow 818 indicates the direction of a stray field that may also be sensed by the sensing elements 401-404. Each of the magnetic field components identified by the arrows 815-819 is substantially parallel to the plane of the sensor 110.

The common-mode signal Vcom of the sensing bridge 406 may have a direct current (DC) component generated in response to the directly-coupled field that are incident on the sensing bridge 406 (but not in response to the reflected magnetic field 122 significantly, regardless of whether the target is moving). The differential signal Vdiff of the sensing bridge 406 may have an alternating current (AC) component generated in response to the reflected magnetic field 122 that are incident on the sensing bridge 306. The spatial arrangement of the sensing elements 401-404 (shown in FIG. 4B) causes the AC and DC components of the common-mode signal Vcom and the differential signal Vdiff to drift in the same direction when the sensor 110 is exposed to a stray field. Because the two signals Vdiff and Vcom react in the same manner to stray fields (e.g., through sensitivity changes), the common-mode signal Vcom (which contains information about the known directly coupled field 112) can be used to normalize the differential signal Vdiff (which contains information about the reflected field based on target position and any stray fields). The normalization may be performed to correct for drift that is caused by the stray field.

Figure 4C:
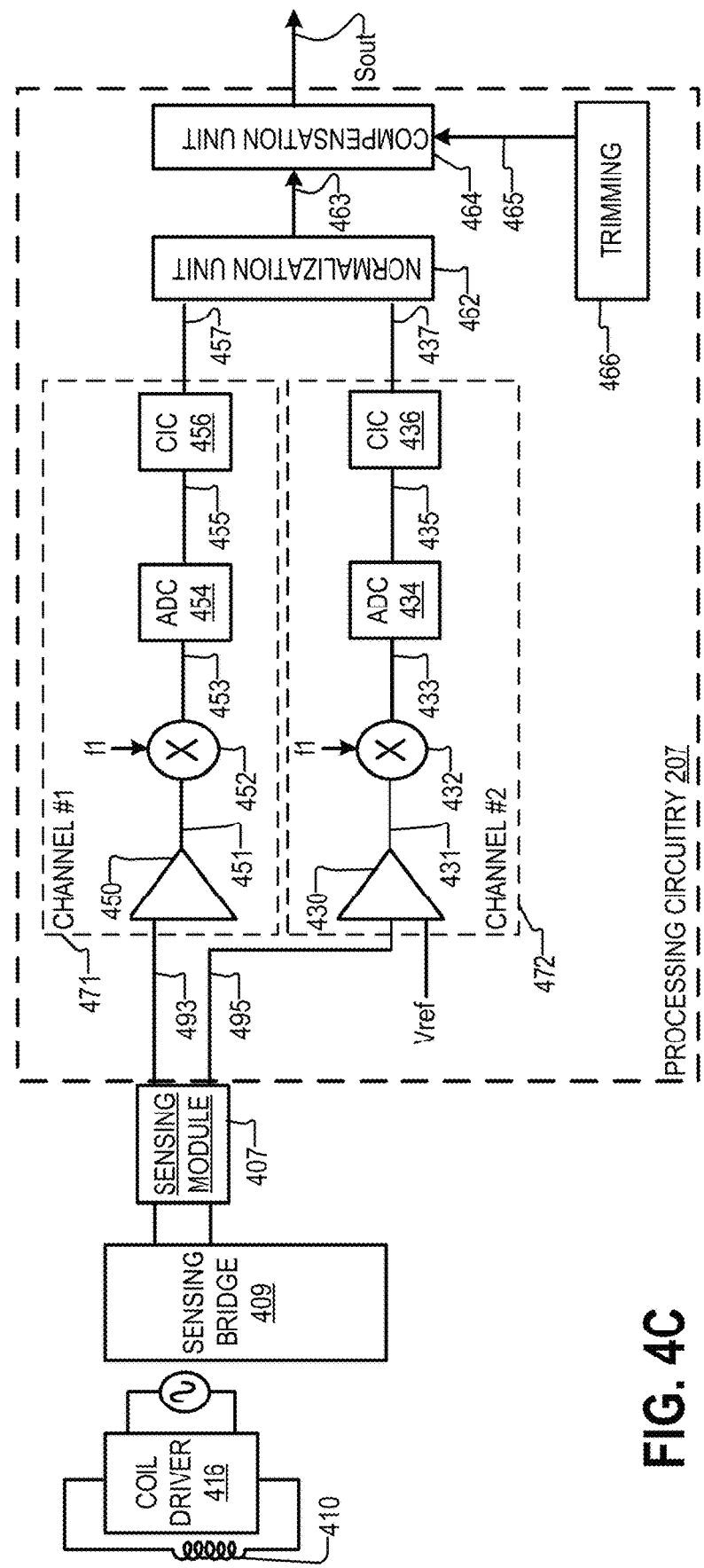
FIG. 4C is a diagram of an example of a magnetic field sensor, according to aspects of the disclosure.

FIG. 4C is a diagram of the sensor 110, according to aspects of the disclosure. FIG. 4C illustrates a possible implementation of the processing circuitry 418. In this implementation, the processing circuitry 418 includes first channel 471, a second channel 472, a normalization unit 462, a compensation unit 464, and a trimming unit 466.

The first channel 471 may include an amplifier 450, a demodulator 452, an analog-to-digital converter (ADC) 454, and a cascaded integrator comb (CIC) filter 456. The amplifier 450 may receive the signal 493 of the sensing bridge 406 and amplify it to produce a signal 451. As noted above, the signal 493 may be the differential signal Vdiff of the sensing bridge 406, modulated at frequency f1. The demodulator 452 may demodulate the signal Vdiff at frequency f1 to produce a signal 453. The signal 453 may be equal to the differential signal Vdiff of the sensing bridge 406, at baseband. The ADC 454 may digitize the signal 453 to produce a signal 455. The CIC filter 456 may filter the signal 455 to produce a signal 457.

The second channel 472 may include an amplifier 430, a demodulator 432, an analog-to-digital converter (ADC) 434, and a cascaded integrator comb (CIC) filter 436. The amplifier 430 may receive the signal 495 of the sensing bridge 406 and a signal Vref As noted above, the signal 495 may be the common voltage signal Vcom of the sensing bridge 406, modulated at frequency f1. The amplifier 430 may subtract the signal Vref from the signal 495, and amplify the resulting difference, to produce a signal 431. The demodulator 432 may demodulate the signal 431 at frequency f1 to produce a signal 433. The ADC 434 may digitize the signal 433 to produce a signal 435. The CIC filter 436 may filter the signal 435 to produce a signal 437. According to the present example, the signal Vref is equal to the common-mode voltage of the sensing bridge 406 when no magnetic fields are incident on the sensing bridge 406. However, the present disclosure is not limited to any specific value of the signal Vref.

The normalization unit 462 may receive the signals 457 and 437 and generate a signal 463. The signal 463 may be generated by normalizing the signal 457 with respect to the signal 437. In some implementations, the signal 463 may be generated in accordance with Equation 11 below:

$$SIG_{463} = \frac{SIG_{457} - SIG_{437}}{SIG_{457} + SIG_{437}} \tag{11}$$

where $SIG_{463}$ is the signal 463, $SIG_{457}$ is the signal 457, and $SIG_{437}$ is the signal 437.

It will be appreciated by those of ordinary skill in the art that while the configuration of elements 401-404 shown in FIG. 4B and electrical connection of those elements in the sensing bridge 406 of FIG. 4A result in the reflected field 122 being encoded in the differential signal Vdiff and the direct field 112 being encoded in the common-mode signal Vcom, re-arrangement of the elements spatially and/or electrical coupling of the elements in the sensing bridge 406 can alternatively cause the reflected field 122 to be encoded in the common-mode signal Vcom and the direct field 112 to be encoded in the differential signal Vdiff.

The compensation unit 464 may generate the signal Sout based on the signal 463. In some implementations the compensation unit 464 may generate the signal Sout by linearizing the signal 463. Additionally or alternatively, in some implementations, the compensation unit 464 may generate the signal Sout by adjusting the gain and/or offset of the signal 463. The gain and/or offset of the signal 463 may be adjusted based on a signal 465, which is generated by the trimming unit 466. In some implementations, the signal 465 may be generated based on a signal provided by a temperature sensor, a stress sensor, a humidity sensor. It will be understood that the present disclosure is not limited to any specific technique for adjusting the gain and/or offset of the signal 463.

The spatial arrangement of the sensing elements 401-404 (shown in FIG. 4B) in combination with their electrical coupling (shown in FIG. 4A) causes the differential signal Vdiff of the sensing bridge 406 to be representative of the reflected magnetic field 122. Furthermore, the spatial arrangement of the sensing elements 401-404 (shown in FIG. 4B) in combination with their electrical coupling (shown in FIG. 4A) causes the common-mode signal Vcom of the sensing bridge 406 to be representative of the direct magnetic field 112. In this regard, normalizing the signal Vdiff with respect to Vcom, yields the AC component of the signal Vdiff that is generated solely in response to the reflected magnetic field 122 (e.g., the signal 463).

Because the spatial arrangement and electrical coupling of the sensing elements 401-404 generates separate signals Vdiff, Vcom that represent the reflected and direct fields 122, 112, respectively, techniques are not required to isolate the detected direct field 112 from detected reflected field 122. Furthermore, because detection of the two fields is isolated by virtue of the spatial relationship and electrical coupling of the elements 401-404 (i.e., detection of the two fields is not superimposed on the same electrical signal), it is possible to operate the sensor to detect the position of the target 120 even when the target is not moving (i.e., at "zero speed" when the target position is a DC component).

Figure 5:
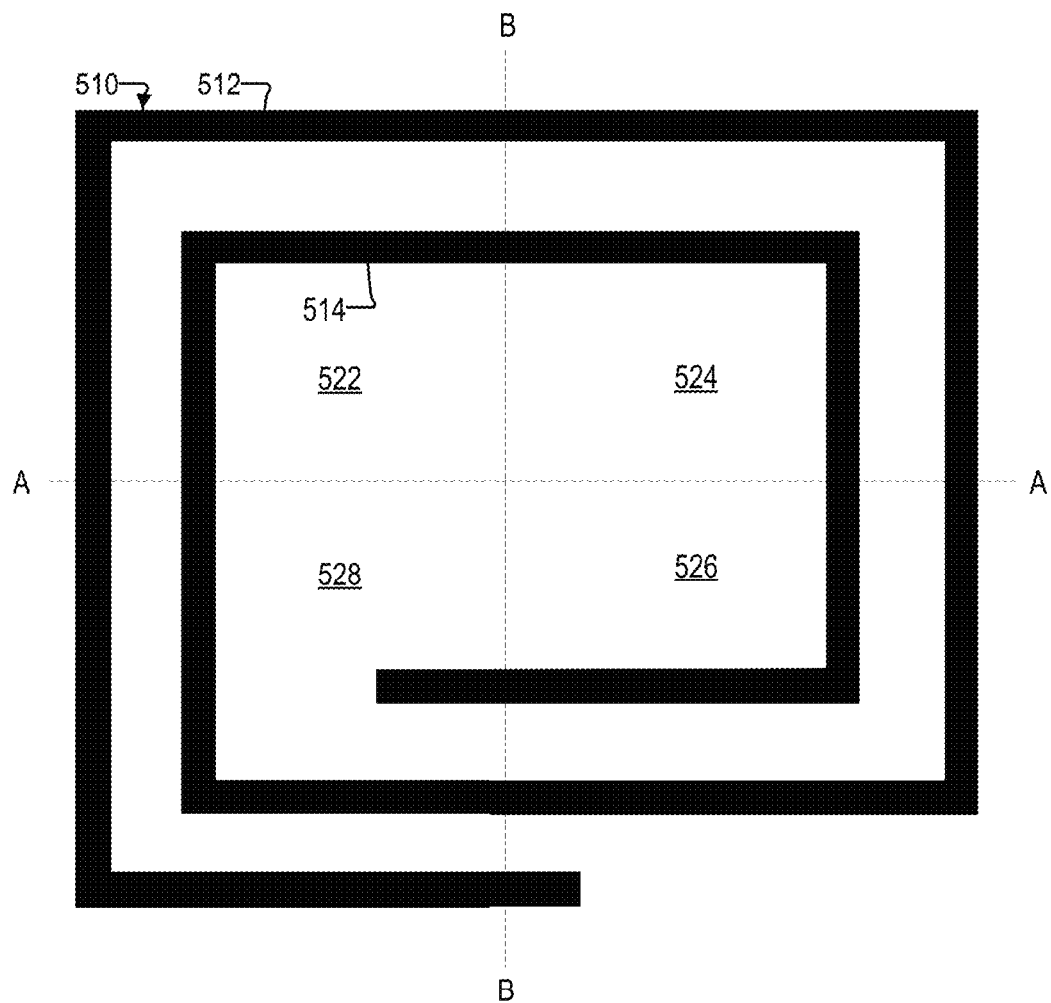
FIG. 5 is a diagram of an example of a transmission coil, according to aspects of the disclosure.
Figure 4C:
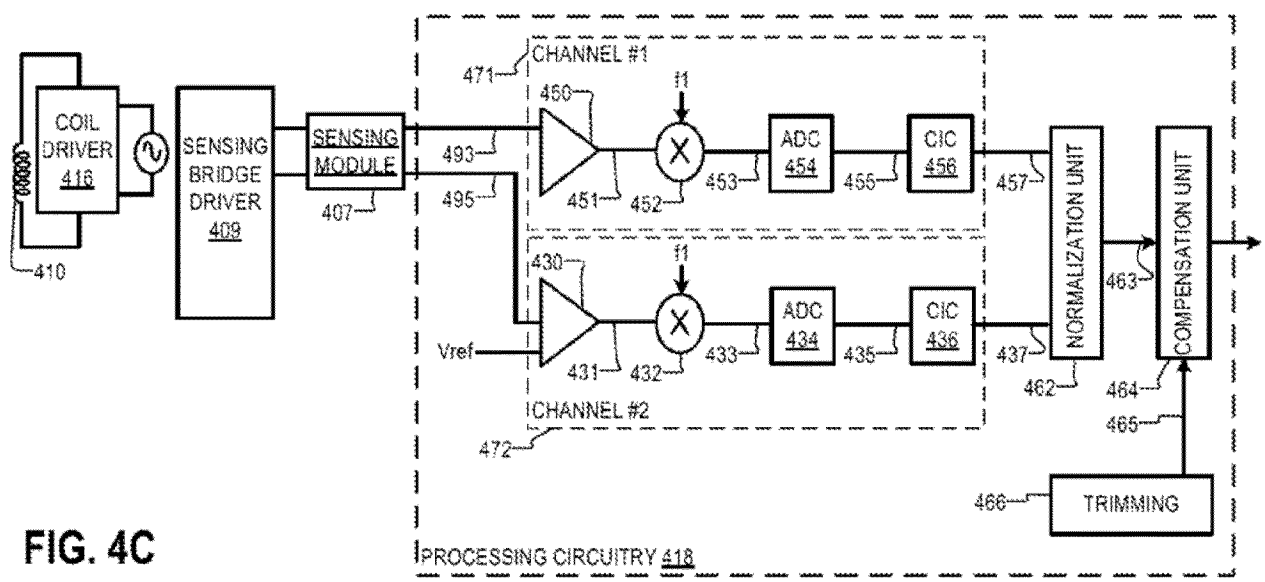

FIG. 5 is a diagram of an example of a transmission coil 510. As illustrated the transmission coil 510 includes an outer turn 512 and an inner turn 514. The inner turn has axis A-A and B-B that intersect one another at a 90-degree angle and divide the space inside the inner turn 514 into quadrants 522, 524, 526, and 528. Under the nomenclature of the present disclosure, quadrants 522 and 526 are diagonally opposed, and quadrants 528 and 524 are also diagonally opposed. Furthermore, under the nomenclature of the present disclosure: quadrant 522 is adjacent to quadrant 524 (and vice versa); quadrant 524 is adjacent to quadrant 526 (and vice versa); and quadrant 526 is adjacent to quadrant 528 (and vice versa). FIG. 5 is provided to illustrate the concepts of "quadrants being diagonally opposed" and "quadrants being adjacent," which can be used to describe the spatial arrangements illustrated in FIGS. 2B and 3B. For instance, in the example of FIG. 2B, the magnetic field sensing elements 201 and 203 are formed in diagonally opposed quadrants of the inner turn 214. Furthermore, in the example of FIG. 2B, the magnetic field sensing elements 202 and 204 are also formed in quadrants of the inner turn 214 that are diagonally opposed. In the example of FIG. 3B, sensing elements 301 and 303 are formed in quadrants of the inner turn 314 that are adjacent to one another. Similarly, sensing elements 302 and 304 are also formed in adjacent quadrants. Although in the example of FIG. 5 quadrants 522, 524, 526, and 528 have the same size, alternative implementations are possible in which at least two of quadrants 522, 524, 526, and 528 have different sizes. Although in the example of FIG. 5 quadrants 522, 524, 526, and 528 have the same shapes, alternative implementations are possible in which at least two of quadrants 522, 524, 526, and 528 have different shapes.

The processes described herein may be implemented in hardware, software, or a combination of the two. The processes described herein may be implemented in computer programs executed on programmable computers/machines that each includes a processor, a non-transitory machine-readable medium or another article of manufacture that is readable by the processor (including volatile and non-volatile memory and/or storage elements), at least one input device, and one or more output devices. Program code may be applied to data entered using an input device to perform any of the processes described herein and to generate output information.

The present disclosure is not limited to using any specific type of sensing element to implement the sensing bridges 206, 306, and 406. Any of the sensing elements in the bridges 206, 306, and 406 can include one or more magnetic field sensing elements, such as Hall effect elements, magnetoresistance elements, or magnetotransistors, and can include one or more such elements of the same or different types. As is known, there are different types of Hall effect elements, for example, a planar Hall element, a vertical Hall element, and a Circular Vertical Hall (CVH) element. As is also known, there are different types of magnetoresistance elements, for example, a semiconductor magnetoresistance element such as Indium Antimonide (InSb), a giant magnetoresistance (GMR) element, for example, a spin valve, an anisotropic magnetoresistance element (AMR), a tunneling magnetoresistance (TMR) element, and a magnetic tunnel junction (MTJ). The magnetic field sensing element may be a single element or, alternatively, may include two or more magnetic field sensing elements arranged in various configurations, e.g., a half bridge or full (Wheatstone) bridge. Depending on the device type and other application requirements, the magnetic field sensing element may be a device made of a type IV semiconductor material such as Silicon (Si) or Germanium (Ge), or a type III-V semiconductor material like Gallium-Arsenide (GaAs) or an Indium compound, e.g., Indium-Antimonide (InSb).

The system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers). Each such program may be implemented in a high-level procedural or object-oriented programming language to work with the rest of the computer-based system. However, the programs may be implemented in assembly, machine language, or Hardware Description Language. The language may be a compiled or an interpreted language, and it may be deployed in any form, including as a stand-alone program or as a module, component, subroutine, or another unit suitable for use in a computing environment. A computer program may be deployed to be executed on one computer or multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

Having described preferred embodiments, which serve to illustrate various concepts, structures and techniques, which are the subject of this patent, it will now become apparent that other embodiments incorporating these concepts, structures and techniques may be used. Accordingly, it is submitted that the scope of the patent should not be limited to the described embodiments but rather should be limited only by the spirit and scope of the following claims.

The invention claimed is:

1. A magnetic field sensor comprising:
a substrate;
a transmission coil formed on the substrate, the transmission coil being configured to generate a direct magnetic field;
a sensing bridge that is formed on the substrate, the sensing bridge being configured to detect the direct magnetic field and a reflected magnetic field that is generated by a target, the reflected magnetic field being generated in response to eddy currents that are induced in the target by the direct magnetic field;
a processing circuitry being configured to generate an output signal that is indicative of a position of the target, the output signal being generated by normalizing a first signal with respect to a second signal, the first signal being generated at least in part by using the sensing bridge, and the second signal being generated at least in part by using the sensing bridge, wherein the second signal is based on the detected direct magnetic field.

2. The magnetic field sensor of claim 1, wherein:
the first signal includes an alternating current (AC) component of a differential signal of the sensing bridge,
the second signal includes a direct current (DC) component of the differential signal of the sensing bridge, and
the sensing bridge includes a plurality of magnetic field sensing elements that are disposed on the substrate in an arrangement that causes the AC and DC components of the differential signal to change in a same direction in response to the direct magnetic field.

3. The magnetic field sensor of claim 1, wherein:
the first signal includes a differential signal of the sensing bridge,
the second signal is generated by calculating an average of a positive peak signal and a negative peak signal that are generated based on the differential signal, and
the sensing bridge includes a plurality of magnetic field sensing elements that are disposed on the substrate in an arrangement that causes the AC and DC components of the differential signal to change in a same direction in response to the direct magnetic field.

4. The magnetic field sensor of claim 1, wherein:
the first signal includes an alternating current (AC) component of a common-mode signal of the sensing bridge,
the second signal includes a direct current (DC) component of the common-mode signal of the sensing bridge, and
the sensing bridge includes a plurality of magnetic field sensing elements that are disposed on the substrate in an arrangement that causes the AC and DC components of the differential signal to change in a same direction in response to the direct magnetic field.

5. The magnetic field sensor of claim 1, wherein:
the first signal includes a common-mode signal of the sensing bridge,
the second signal is generated by calculating an average of a positive peak signal and a negative peak signal that are generated based on the common-mode signal, and
the sensing bridge includes a plurality of magnetic field sensing elements that are disposed on the substrate in an arrangement that causes the AC and DC components of the differential signal to change in a same direction in response to the direct magnetic field.

6. The magnetic field sensor of claim 1, wherein:
the first signal includes one of a differential signal and a common-mode signal of the sensing bridge, and
the second signal includes the other one of the common-mode signal and the differential signal of the sensing bridge.

7. A method for use in a magnetic field sensor, comprising:
generating a direct magnetic field by using a transmission coil that is formed on a substrate;
generating a first signal and a second signal that are associated with the direct magnetic field and a reflected magnetic field, the reflected magnetic field being generated by a target in response to eddy currents that are induced in the target by the direct magnetic field; and
generating an output signal that is indicative of a position of the target, the output signal being generated by normalizing the first signal with respect to the second signal,
wherein the first signal and the second signal are generated by using a sensing bridge that is arranged to sense the reflected magnetic field.

8. The method of claim 7, wherein:
the first signal includes an alternating current (AC) component of a differential signal of the sensing bridge,
the second signal includes a direct current (DC) component of the differential signal of the sensing bridge, and
the sensing bridge includes a plurality of magnetic field sensing elements that are disposed on the substrate in an arrangement that causes the AC and DC components of the differential signal to change in a same direction in response to the direct magnetic field.

9. The method of claim 7, wherein:
the first signal includes a differential signal of the sensing bridge,
the second signal is generated by calculating an average of a positive peak signal and a negative peak signal that are generated based on the differential signal, and
the sensing bridge includes a plurality of magnetic field sensing elements that are disposed on the substrate in an arrangement that causes the AC and DC components of the differential signal to change in a same direction in response to the direct magnetic field.

10. The method of claim 7, wherein:
the first signal includes an alternating current (AC) component of a common-mode signal of the sensing bridge,
the second signal includes a direct current (DC) component of the common-mode signal of the sensing bridge, and
the sensing bridge includes a plurality of magnetic field sensing elements that are disposed on the substrate in an arrangement that causes the AC and DC components of the differential signal to change in a same direction in response to the direct magnetic field.

11. The method of claim 7, wherein:
the first signal includes a common-mode signal of the sensing bridge,
the second signal is generated by calculating an average of a positive peak signal and a negative peak signal that are generated based on the common-mode signal, and
the sensing bridge includes a plurality of magnetic field sensing elements that are disposed on the substrate in an arrangement that causes the AC and DC components of the differential signal to change in a same direction in response to the direct magnetic field.

12. The method of claim 7, wherein:
the first signal includes one of a differential signal and a common-mode signal of the sensing bridge, and
the second signal includes the other one of the common-mode signal and the differential signal of the sensing bridge.

13. A sensor, comprising:
a substrate;
a transmission coil formed on the substrate, the transmission coil being configured to generate a direct magnetic field;
a sensing bridge formed on the substrate, the sensing bridge being configured to detect a reflected magnetic field that is generated by a target, the reflected magnetic field being generated in response to eddy currents that are induced in the target by the direct magnetic field; and
a processing circuitry being configured to generate an output signal that is indicative of a position of the target, the output signal being generated by normalizing at least one of: (i) a differential signal of the sensing bridge or (ii) an AC component of the differential signal with respect to a DC component of the differential signal.

14. The sensor of claim 13, wherein the sensing bridge includes a plurality of magnetic field sensing elements that are disposed on the substrate in an arrangement that causes the AC and DC components of the differential signal to change in a same direction in response to the direct magnetic field.

15. The sensor of claim 13, wherein:
the transmission coil includes an inner turn and an outer turn, the inner turn having a set of quadrants,
the sensing bridge includes a first and second magnetic field sensing elements that are coupled in series to one another, the second magnetic field sensing element being coupled to a voltage source via the first magnetic field sensing element, the first and second magnetic field sensing elements being formed on the substrate, inside the inner turn;
the sensing bridge includes a third and fourth magnetic field sensing elements that are coupled in series to one another and in parallel to the first and second magnetic field sensing elements, the fourth magnetic field sensing element being coupled to the voltage source via the third magnetic field sensing element, the third and fourth magnetic field sensing elements being formed on the substrate, inside the inner turn,
the first and third magnetic field sensing elements are formed in first and second quadrants of the inner turn that are diagonally opposed, and
the second and fourth magnetic field sensing elements are formed in third and fourth quadrants of the inner turn that are diagonally opposed.

16. The sensor of claim 13, wherein the sensing bridge includes a plurality of magnetic field sensing elements, each of the magnetic field sensing elements including at least one at least one of a Hall element, a giant magnetoresistance (GMR) element, a tunnel magnetoresistance (TMR) element, an anisotropic magnetoresistance (AMR) element, and a magnetic tunnel junction (MTJ) element.

17. A sensor, comprising:
a substrate;
a transmission coil formed on the substrate, the transmission coil being configured to generate a direct magnetic field;
a sensing bridge formed on the substrate, the sensing bridge being configured to detect a reflected magnetic field that is generated by a target, the reflected magnetic field being generated in response to eddy currents that are induced in the target by the direct magnetic field; and
a processing circuitry being configured to generate an output signal that is indicative of a position of the target, the output signal being generated by normalizing at least one of: (i) a common-mode signal of the sensing bridge or (ii) an AC component of the common-mode signal with respect to a DC component of the differential signal.

18. The sensor of claim 17, wherein the sensing bridge includes a plurality of magnetic field sensing elements that are disposed on the substrate in an arrangement that causes the AC and DC components of the common-mode signal to change in a same direction in response to the direct magnetic field.

19. The sensor of claim 17, wherein:
the transmission coil includes an inner turn and an outer turn, the inner turn having a set of quadrants,
the sensing bridge includes a first and second magnetic field sensing elements that are coupled in series to one another, the second magnetic field sensing element being coupled to a voltage source via the first magnetic field sensing element, the first and second magnetic field sensing elements being formed on the substrate, inside the inner turn;
the sensing bridge includes a third and fourth magnetic field sensing elements that are coupled in series to one another and in parallel to the first and second magnetic field sensing elements, the fourth magnetic field sensing element being coupled to the voltage source via the third magnetic field sensing element, the third and fourth magnetic field sensing elements being formed on the substrate, inside the inner turn,
the first and third magnetic field sensing elements are formed in a first and second quadrants of the inner turn that are adjacent to one another, and
the second and fourth magnetic field sensing elements are formed in a third and fourth quadrants of the inner turn that are adjacent to one another.

20. The sensor of claim 17, wherein the sensing bridge includes a plurality of magnetic field sensing elements, each of the magnetic field sensing elements including at least one at least one of a Hall element, a giant magnetoresistance (GMR) element, a tunnel magnetoresistance (TMR) element, an anisotropic magnetoresistance (AMR) element, and a magnetic tunnel junction (MTJ) element.

* * * * *

UNITED STATES PATENT AND TRADEMARK OFFICE
CERTIFICATE OF CORRECTION

| | |
|---|---|
| PATENT NO. | : 11,493,361 B2 |
| APPLICATION NO. | : 17/186346 |
| DATED | : November 8, 2022 |
| INVENTOR(S) | : Hernán D. Romero |

It is certified that error appears in the above-identified patent and that said Letters Patent is hereby corrected as shown below:

In the Drawings

A corrected copy of FIG. 4C is shown on the attached drawing sheet.

In the Specification

Column 4, Line 38 delete "are incident" and replace with --is incident--.

Column 6, Line 54 delete "to-a" and replace with --to a--.

Column 7, Line 29 delete "MR bridge 306" and replace with --sensing bridge 306--.

Column 8, Line 44 delete "are incident" and replace with --is incident--.

Column 8, Line 47 delete "and/or that are" and replace with --and/or AC stray magnetic fields that are--.

Column 9, Line 11 delete "VREF" and replace with --Vref--.

Column 10, Line 54 delete "that are" and replace with --that is--.

Column 11, Line 31 delete "LPF 360" and replace with --HPF 360--.

Column 12, Line 62 delete "inner turn 415," and replace with --inner turn 414,--.

Column 13, Line 10 delete "field that sensed" and replace with --field 112 that is sensed--.

Column 13, Line 18 delete "field that are" and replace with --field 112 that is--.

Signed and Sealed this
Thirty-first Day of December, 2024

Derrick Brent
*Acting Director of the United States Patent and Trademark Office*

CERTIFICATE OF CORRECTION (continued)
U.S. Pat. No. 11,493,361 B2

Column 13, Line 24 delete "sensing bridge 306." and replace with --sensing bridge 406.--.

Column 13, Line 60 delete "Vref As" and replace with --Vref. As--.